US008223237B2

(12) United States Patent
Kudoh et al.

(10) Patent No.: US 8,223,237 B2
(45) Date of Patent: Jul. 17, 2012

(54) SOLID-STATE IMAGING DEVICE IN WHICH A TRANSFER SIGNAL LINE IS HELD AT A CONSTANT VOLTAGE TO PREVENT CROSSTALK AND ELECTRONIC DEVICE WITH SUCH SOLID-STATE IMAGING DEVICE

(75) Inventors: Yoshiharu Kudoh, Tokyo (JP); Hiroaki Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 12/472,457

(22) Filed: May 27, 2009

(65) Prior Publication Data

US 2009/0295958 A1    Dec. 3, 2009

(30) Foreign Application Priority Data

May 30, 2008   (JP) ................................. 2008-143630

(51) Int. Cl.
*H04N 3/14*   (2006.01)
*H04N 5/335*   (2011.01)
*H01L 27/00*   (2006.01)

(52) U.S. Cl. ..................................... 348/308; 250/208.1

(58) Field of Classification Search .................. 348/294, 348/302, 308–310; 250/208.1
See application file for complete search history.

(56) References Cited

U.S. PATENT DOCUMENTS

2006/0176383 A1 *   8/2006   Funakoshi et al. ............ 348/308

FOREIGN PATENT DOCUMENTS

JP    2006-217305    8/2006

* cited by examiner

*Primary Examiner* — Alicia M Harrington
(74) *Attorney, Agent, or Firm* — SNR Denton US LLP

(57) ABSTRACT

Disclosed is a solid-state imaging device including a photoelectric conversion portion photoelectrically converting incident light into signal charge and accumulate the signal charge, a plurality of signal lines including a transfer signal line to which a transfer signal for reading the signal charge accumulated in the photoelectric conversion portion to a floating diffusion region is input, a driver circuit inputting a plurality of desired signals into the plurality of signal lines including the transfer signal line, and a terminal circuit connected to a side opposite to a side of the transfer signal line where the driver circuit is connected and to which a control signal for securing the transfer signal line at a constant voltage is input before a desired signal of the plurality of desired signals with respect to a signal line adjacent to the transfer signal line of the plurality of signal lines is input to the signal line adjacent to the transfer signal line.

3 Claims, 12 Drawing Sheets

SOLID-STATE IMAGING DEVICE IN WHICH A TRANSFER SIGNAL LINE IS HELD AT A CONSTANT VOLTAGE TO PREVENT CROSSTALK AND ELECTRONIC DEVICE WITH SUCH SOLID-STATE IMAGING DEVICE

BACKGROUND OF THE INVENTION

1. Field of the Invention

The invention relates to a solid-state imaging device in which signal lines are closely arranged, a method of driving the solid-state imaging device, and an electronic device including such a solid-state imaging device.

2. Description of the Related Art

Complementary metal oxide semiconductor (CMOS) image sensors (CIS) have increasingly been used alternative to related-art charge coupled device (CCD) image sensors for attaining enhanced functionality and low power consumption.

Technology in reducing sizes of pixels and increasing the number of pixels has rapidly advanced in the field of recent CMOS sensors or CIS. The CIS field has successfully employed advanced process technology for CMOS LSI to develop smaller pixels to overtake the CCD image sensor field, which has once preceded the CIS field in reducing sizes of pixels. The CIS employs, as compared to the CCD image sensor, more components in the pixel and operation thereof is not simple so that the CIS includes signal line arrangement in the pixel similar to that used in a metal layer for a logic circuit. However, since incident paths need preparing for light incident upon photodiodes (PDs) that are used as photoelectric conversion elements, signal lines may have to be closely arranged in a limited area. If the number of pixels is increased in such a configuration, not only may the signal lines need elongating, but distances between adjacent signal lines, where signals are transmitted, may also need increasing. Consequently, the resistance of the signal line and the capacitance between the signal lines are both likely to increase, thereby increasing occurrence of signal crosstalk between signal lines adjacent to one another.

The crosstalk occurred in a case where a distance between the signal lines adjacent to each other is short is described with reference to FIG. 1.

FIG. 1 shows two signal lines arranged in the row direction in a solid-state imaging device; in which the upper signal line 100 indicates one of a transfer signal line, selection signal line, and reset signal line whereas the lower signal line 101 indicates an adjacent signal line adjacently arranged to the upper signal line 100. As shown in FIG. 1, if the signal lines 100 and 101 are adjacently arranged to each other, the resistance R increases at a portion distant from a driver circuit 102, and the capacitance C also increases between the signal lines 100 and 101. Thereafter, when a desired pulse signal φsig is input from the driver circuit 102 to the upper signal line 100, a differential component of the pulse signal φsig (differential pulse) is generated in the adjacent signal line 101. If the differential pulse generated is transmitted to turn ON the OFF-state transfer gate in the signal line 101, crosstalk occurs in the originally undriven signal line 101. This phenomenon is called "crosstalk". If the signal line 101, which is being affected by the crosstalk, is a transfer signal line, in particular, the signal charge will be leaked from the photodiode.

In order to control the crosstalk occurred between the signal lines, it may be necessary to reduce the resistance R and the capacitance C between the signal lines. However, it is unpreferable to use a method in which the resistance R and the capacitance C between the signal lines are lowered by increasing the width of each of the signal lines or increasing the distance between the signal lines, because the method prevents rays of light from gathering to the photodiode which is used as a photoelectric conversion element. It is also undesirable to reduce output impedance of the driver circuit 102, because the resistance of signal line is too large to reduce the output impedance, thereby exhibiting no effect thereof.

In view of the aforementioned method, there may be provided a method of increasing or decreasing the apparent signal line resistance R and apparent capacitance C between the signal lines, in which driver circuits are arranged at both ends of the signal lines 100, 101 so as to drive each of the signal lines 100, 101 from both sides thereof. With this method, since load acting on each of the driver circuits are reduced by half, the signal line resistance R and the capacitance C between the signal lines can both be lowered.

However, in a case where the driver circuits are arranged at both ends of the signal lines 100, 101, control signals input to the driver circuits may need synchronizing. If the control signals are unsynchronized, transition of signals will be delayed. Specifically, in the use of CMOS driver circuits therefor, the method is particularly unpreferable to be used, because significantly unsynchronized control signals from both ends may result in the signal charge leakage.

In view of the aforementioned signal charge leakage due to the unsynchronized control signals, Japanese Unexamined Patent Application Publication No. 2006-217905 discloses a method of controlling output impedance, specifically, to control crosstalk that occurs between the signal lines. The publication discloses a circuit configuration to control the impedance of a terminal transistor, in which the crosstalk is lowered by reusing an original signal provided from one end of the signal line. In this configuration, the impedance of the terminal transistor is set to be low when other signals are input using the feedback of the original signal provided from one end of the signal line. The signal electric potential in the signal line is secured due to lowered impedance of the terminal transistor. Thus, signal fluctuation due to crosstalk can be inhibited.

SUMMARY OF THE INVENTION

However, in the method disclosed in the publication, since the feedback of the signal is used to control the impedance of the terminal transistor, the feedback thereof will be an obstacle when the signal from one end of the signal line is transmitted. That is, the terminal transistor works in a direction of retaining the signal from one end of the signal line at the opposite side of the driver when the signal transitions. This appears an increase of impedance when viewing from the driver side, and thus, longer time may be required for the signal transition.

Embodiments of the invention have attempted to provide a solid-state imaging device capable of preventing lowering the rates of signal transition and controlling crosstalk, a method of driving the solid-state imaging device, and an electronic device including such a solid-state imaging device.

In view of the aforementioned factors, a solid-state imaging device according to an embodiment of the invention includes the following configuration.

The solid-state imaging device includes a photoelectric conversion portion configured to convert incident light into an electric signal and accumulate signal charge, and a plurality of signal lines including a transfer signal line, to which a transfer signal for reading the signal charge accumulated in the photoelectric conversion portion to a floating diffusion is input.

The solid-state imaging device further includes a driver circuit configured to input desired signals to the plurality of signal lines including a transfer signal line. The solid-state imaging device still further includes a terminal circuit connected to an opposite side of the transfer signal line to the driver circuit connected thereto and to which a control signal for securing the transfer signal line at a constant voltage has been input before one of the desired signals is input to the other signal line adjacent to the transfer signal line.

Specifically, the solid-state imaging device according to an embodiment of the invention includes a terminal circuit connected to an opposite end of the transfer signal line to the driver circuit that drives a transfer signal line.

In the solid-state imaging device according to an embodiment of the invention, when desired signals are input to other signal lines adjacent to the transfer signal line, the transfer signal line is secured at a constant potential due to an input of the control signal to the terminal circuit. Thus, since the resistance of the transfer signal line or the capacitance between the transfer signal line and other signal lines are lowered, an adverse effect from signals input to other signal lines may be lowered.

A method of driving the solid-state imaging device according to an embodiment of the invention includes the following steps.

The steps includes causing light to fall onto a photoelectric conversion portion, and converting light into electric charge and accumulating electric charge. The steps further includes inputting a desired signal to at least one desired signal line of a plurality of signal lines provided for transfer signal charge from a driver circuit connected to one side of the signal lines. The steps still further includes securing a signal line of the plurality of signal lines adjacent to the desired signal line to which the desired signal is input at a constant voltage before the signal is input to the desired signal line.

A method of driving the solid-state imaging device according to an embodiment of the invention includes securing a signal line of the plurality of signal lines adjacent to the desired signal line to which the desired signal is input at a constant voltage before the desired signal is input to the desired signal line. Accordingly, the number of erroneous signals input to the signal line adjacent to the desired signal line due to an adverse effect by the signal input may be decreased.

An electronic device according to an embodiment of the invention includes an optical system, a solid-state imaging device, and a signal processing circuit. The solid-state device includes the following configuration.

The solid-state imaging device includes a photoelectric conversion portion configured to convert incident light into electric charge and accumulate the signal charge, and a plurality of signal lines including a transfer signal line to which a transfer signal for reading the signal charge accumulated in the photoelectric conversion portion to a floating diffusion is input.

The solid-state imaging device further includes a driving circuit configured to input desired signals to the plurality of signal lines including a transfer signal line. The solid-state imaging device still further includes a terminal circuit to which a control signal for securing the transfer signal line at a constant voltage has been input before the desired signal is input to the signal line adjacent to the transfer signal line.

Specifically, the solid-state imaging device according to an embodiment of the invention includes a terminal circuit connected to an opposite end of the transfer signal line to the driver circuit that drives a transfer signal line.

In the electronic device including the solid-state imaging device according to an embodiment of the invention, when desired signals are input to signal lines adjacent to the transfer signal line, the transfer signal line is secured at a constant potential due to an input of the control signal to the terminal circuit. Thus, since the resistance of the transfer signal line or the capacitance between the transfer signal line and the signal lines adjacent thereto are lowered, the number of erroneous signals input due to an adverse effect from signals input to the signal lines adjacent to the transfer signal line may be lowered.

According to the embodiments of the invention, a solid-state imaging device and an electronic device capable of exhibiting an improved high definition images by controlling the input of erroneous signals due to crosstalk can be obtained.

DESCRIPTION OF THE PREFERRED EMBODIMENTS

Embodiments of the invention will be described below with reference to accompanying drawings.

[First Embodiment]

Figure 2:
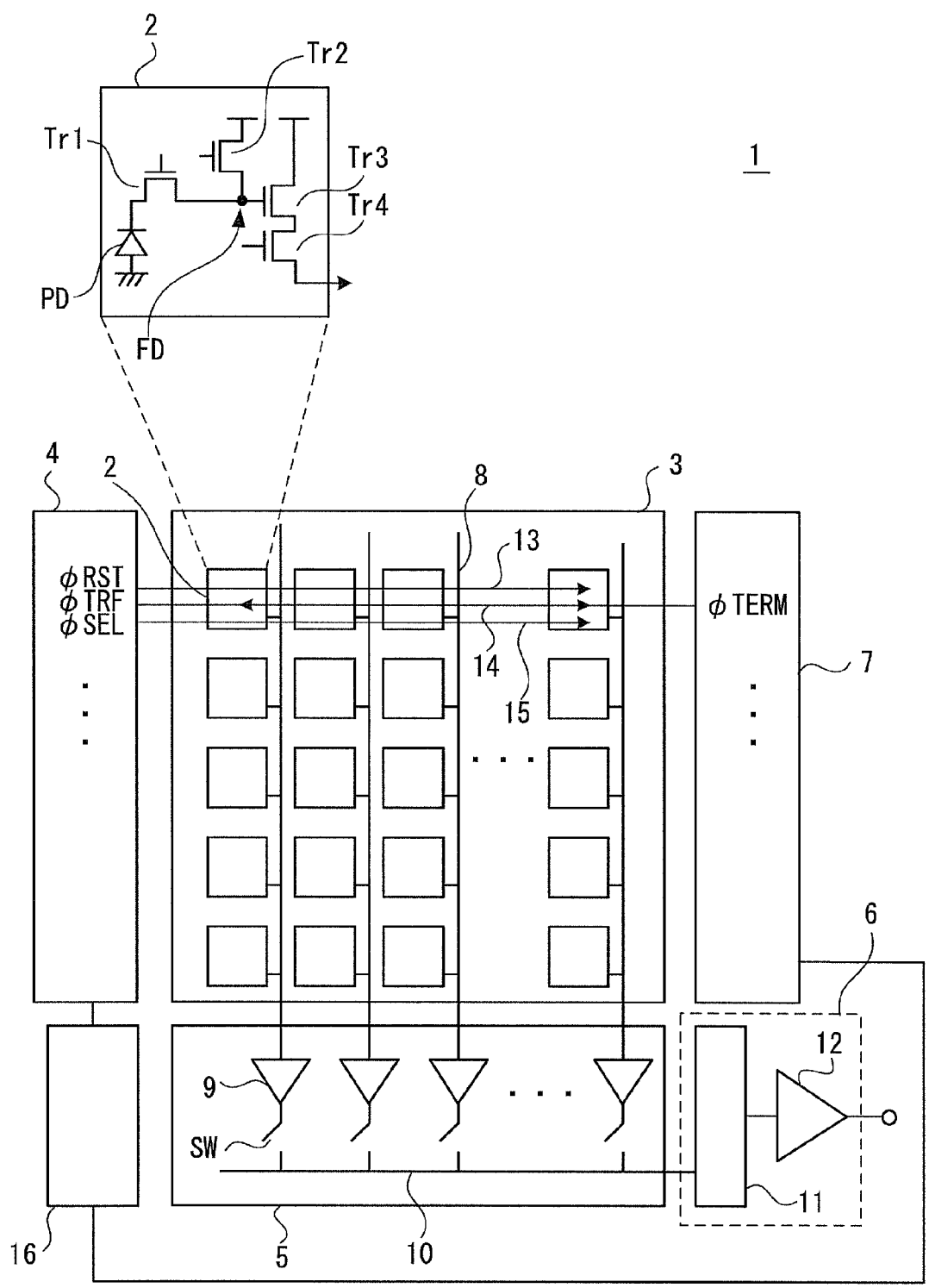
FIG. 2 is a schematic configuration diagram of a solid-state imaging device according to a first embodiment of the invention.

FIG. 2 is a schematic diagram of a solid-state imaging device, so-called a CMOS image sensor, according to the first embodiment of the invention. A solid-state imaging device 1 according to the first embodiment includes an imaging unit (i.e., pixel unit) 3, in which a plurality of pixels 2 are regularly arranged in a 2-dimensional matrix, and peripheral circuits arranged in the periphery of the imaging unit 3. The peripheral circuits include a vertical driver unit 4, a horizontal transfer unit 5, a terminal circuit 7, an output unit 6, and a signal generating circuit to generate desired signals input to the vertical driver unit 4 and the terminal circuit 7.

The pixel 2 includes a photodiode PD that is a photoelectric conversion element, and pixel transistors (MOS transistors).

The photodiode PD of the pixel 2 includes a region in which signal charge generated by photoelectric conversion is accumulated. The pixel transistors include four MOS transistors including a transfer transistor Tr1, a reset transistor Tr2, an amplifier transistor Tr3, and a selection transistor Tr4. The transfer transistor Tr1 reads the signal charge accumulated in the photodiode PD to a floating diffusion region FD. The reset transistor Tr2 configures the potential of the floating diffusion FD region to a constant value. The amplifier transistor Tr3 electrically amplifies the signal charge read to the floating diffusion FD region. The selection transistor Tr4 selects and reads one line of the pixels to a vertical signal line 8.

Although not shown in the figure, a pixel may be configured to include only the three transistors and the photodiode PD, excluding the selection transistor Tr4.

In the circuit configuration of the pixel 2, a source of the transfer transistor Tr1 is connected to the photodiode PD, and a drain thereof is connected to a source of the reset transistor Tr2. The floating diffusion region FD (corresponding to the drain region of transfer transistor, source region of reset transistor), which is used as an electric charge-voltage conversion unit between the transfer transistor Tr1 and the reset transistor Tr2, is connected to a gate of the amplifier transistor Tr3. A source of the amplifier transistor Tr3 is connected to a drain of the selection transistor Tr4. Drains of the reset transistor Tr2 and the amplifier transistor Tr3 are connected to a power-supply voltage supply unit.

A source of the selection transistor Tr4 is connected to the vertical signal line 8.

The vertical driver unit 4 includes a driver circuit for inputting desired pulse signals to the transfer signal line, a reset signal line, and a selection signal line connected to the respective gates of the transfer transistor Tr1, reset transistor Tr2, and selection transistor Tr4. That is, line reset signals φRST are commonly supplied from the vertical driver unit 4 via the reset signal line to the gates of the reset transistors Tr2 in the pixels arranged in one line. Similarly, line transfer signals φTRF are commonly supplied from the vertical driver unit 4 via the transfer signal line to the gates of the transfer transistors Tr1 in the pixels arranged in one line. Further, selection transfer signals φSEL are commonly supplied from the vertical driver unit 4 via the selection signal line to the gates of the selection transistors Tr1 in the pixels arranged in one line.

A horizontal transfer unit 5 includes an analog-to-digital converter 9 connected to the vertical signal line 8, a row selection circuit (switching unit) SW, and a horizontal transfer signal line 10. The output unit 6 usually includes an amplifier, analog-to-digital converter, and/or signal processor; however, the output unit 6 includes a signal processing circuit 11 configured to execute processing on an output from the horizontal transfer signal line 10, and an output buffer 12 in this example. The horizontal transfer signal line 10 includes a bus signal line including signal lines, the number of which is the same as that of the data bit lines, for example.

Figure 3:
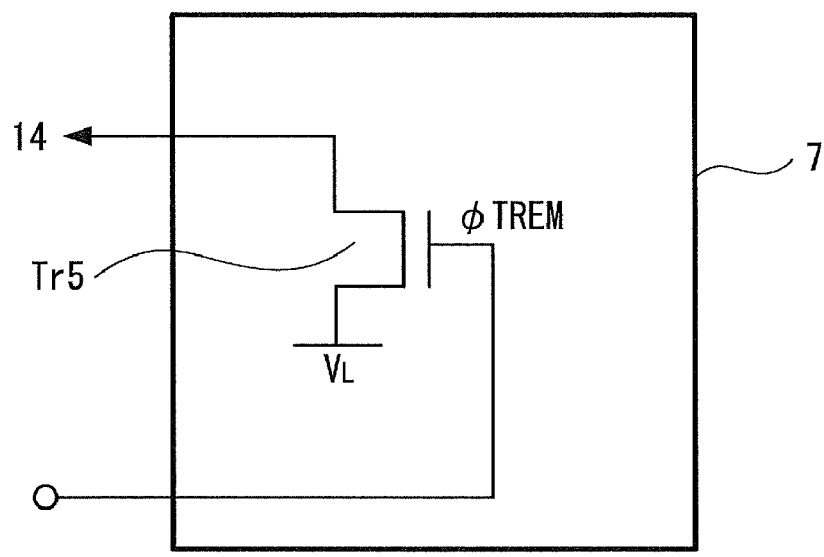
FIG. 3 is a schematic configuration diagram of a terminal circuit.

The terminal circuit 7 is used for securing a desired transfer signal line at a constant voltage, and FIG. 3 shows one configuration example thereof. As shown in FIG. 3, the terminal circuit 7 includes a control transistor 5 formed of a MOS transistor. Either n-channel transistor or p-channel transistor may be used for the control transistor Tr5; however, this example employs n-channel MOS transistor as the control transistor Tr5. A source of the control transistor Tr5 is connected to a low voltage $V_L$ power supply, a control signal φTERM output from a signal generating circuit 16 is supplied to the gate thereof, and a drain thereof is connected to a transfer signal line 14. The terminal circuit 7 is connected to an opposite end of the transfer signal line 14 to an end of which a line transfer signal is supplied. The low voltage $V_L$ may be equal to any levels of low voltage that can be input to the transfer signal line 14, and a typical example of the low voltage may be 0 V.

The terminal circuit 7 may supply the low voltage $V_L$ to the transfer signal line 14 by inputting the control signal φTERM into the gate of the control transistor Tr5.

In this example, the terminal circuit 7 is terminated in the low-level voltage $V_L$ power supply; however, the terminal circuit 7 is not limited thereto. For example, the terminal circuit 7 may be secured at an intermediate potential for increasing a dynamic range. In this case, while a small amount of charge is being accumulated in the photodiode PD, the gate of the transfer signal line 14 is secured at an intermediate potential so as to allow the charge to flow. The gate of the transfer signal line 14 is then closed completely while the charge is being accumulated, and then charge is further accumulated in the remaining time. Specifically, the terminal circuit 7 can be set at an arbitrary potential in compliance with the specification of each sensor. The configuration example of the terminal circuit 7 is not limited to that described in FIG. 3.

The signal generating circuit 16 generates a clock for operating each of the components, a pulse signal generated at a prescribed time, and an address signal supplied to each of the signal lines. The address signals generated in the signal generating circuit 16 are input to a transfer signal driver circuit, reset signal driver circuit, selection signal driver circuit in the vertical driver unit 4 via unshown decoders or the like. A line transfer signal φTRF is defined as a pulse signal input to the transfer signal driver circuit, a line reset signal φRST is defined as a pulse signal input to the reset signal driver circuit, and a line selection signal φSEL is defined as a pulse signal input to the selection signal driver circuit.

Likewise, some of the pulse signals generated in the signal generating circuit 16 are input to the gate of the control transistor Tr5 that forms the terminal circuit 7. A control signal φTERM is defined as such a pulse signal input to the gate of the control transistor Tr5.

In the solid-state imaging device 1, signals from the pixels 2 arranged in the lines are converted from analog to digital signals by the analog-to-digital converter 9, and the converted signals are read and horizontally transferred to the horizontal transfer signal line 10 via the line selection circuit SW, and are then sequentially selected. Image data read to the horizontal transfer signal line 10 is output from the output buffer 12 via the signal processing circuit 11.

[Operation of Solid-state Imaging Device]

General operation carried out in each of the pixels 2 is described.

First, the gates of the transfer transistor Tr1 and the reset transistor Tr2 are turned ON to discharge all charges from the photodiode PD. Next, the gates of the transfer transistor Tr1 and the reset transistor Tr2 are turned OFF to accumulate charges in the photodiode PD. The gate of the reset transistor Tr2 is then turned ON to reset the potential of the floating diffusion (FD) region immediately before reading the charges from the photodiode PD. Thereafter, the gate of the reset transistor Tr2 is turned OFF while the gate of the transfer transistor Tr1 is turned ON to thereby transfer the charges from the photodiode PD to the floating diffusion (PD) region. The amplifier transistor Tr3 electrically amplifies the signal charges supplied to the gate of the amplifier transistor Tr3. In each of the pixels only subject to readout, the gate of the selection transistor Tr4 is turned ON to read charge-voltage converted image signals transmitted from the amplifier transistor Tr3 to the vertical signal line 8.

Figure 4:
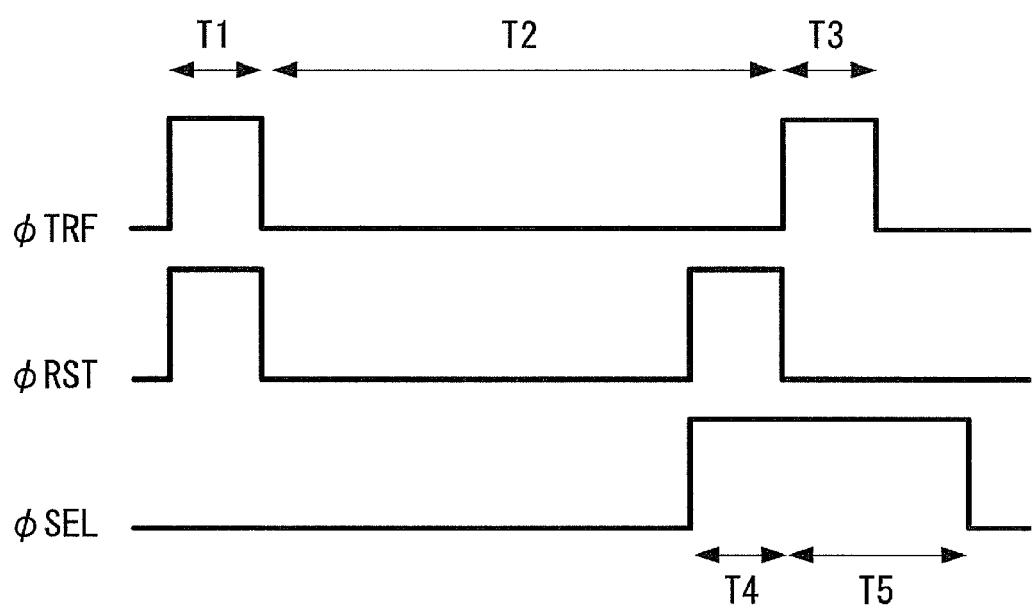
FIG. 4 is an operation timing chart in the solid-state imaging device according to the first embodiment of the invention.

The gates of the transfer transistors Tr1, reset transistors Tr2, selection transistors Tr4 are turned ON or OFF using the line transfer signal φTRF, line reset signal φRST, and line selection signal φSEL supplied from the vertical driver unit 4. FIG. 4 shows one example of operation timing when the aforementioned signal charges are read out. As shown in FIG. 4, all the charges in the photodiode PD are emptied in a time-period T1, and charges are accumulated in a time-period T2. The potential of the floating diffusion FD region is reset in a time-period T4, which is the latter half of the time-period T2, and the reset potential thereof is read out as a reset level. Thereafter, the signal charges accumulated in the photodiodes PD in the time-period T3 are transferred to the floating diffusion FD region, and the potential of the floating diffusion FD region in the time-period T3 is read out to the vertical signal line 8 as a signal in a time-period T5.

The line transfer signal φTRF, line reset signal φRST, and line selection signal φSEL are then sequentially and selectively supplied to the respective signal lines based on address signals output from a signal generating circuit 16. The signal charges of the signal lines selected by the supply of the line selection signals φSEL are read to the vertical signal line 8.

In the solid-state imaging device according to the first embodiment of invention, the control signal φTERM is supplied to the gate of the control transistor Tr5 forming the terminal circuit 7. The control signal φTERM is input to each of the gates of desired ones of unselected transfer signal lines 14. Low voltage $V_L$ is applied to each of the unselected transfer signal lines 14 by the transfer signal driver circuit connected to the transfer signal lines 14. In a case where the control signal φTERM is supplied to the gate of the control transistor Tr5, since a source of the control transistor Tr5 is connected to the low voltage $V_L$ power supply, the low voltage $V_L$ is also being applied to the transfer signal lines 14 by the terminal circuit 7. Accordingly, pulses of the low voltage $V_L$ are synchronized and supplied to both sides of each of the transfer signal lines 14 that are supplied with the control signals φTERM. Since the same voltage is applied to both sides of each of the transfer signal lines supplied with the control signals φTERM, the resistance R of the signal line can be reduced by approximately ½ as compared to the case where the voltage is applied only to a single side thereof, and the capacitance C between the transfer signal line and one of the adjacent signal lines can also be lowered. Thus, in the transfer signal lines 14 supplied with the control signals φTERM, the crosstalk occurred between the transfer signal line 14 and one of the reset signal line 13, selection signal line 15, or another transfer signal line 14 can be suppressed, thereby preventing a decrease of rates of signal transition.

The most detrimental crosstalk may be that occurred in the transfer signal lines 14 for reading the photodiodes. If some gates of the photodiodes are accidentally open due to crosstalk while the photodiodes that have sufficiently been accumulated signal charges are still accumulating signal charges, especially while high-luminance images are being displayed, the signal charges may leak out to the transfer signal lines 14.

In the solid-state imaging device according to the first embodiment of the invention, since the terminal circuit 7 is connected to one ends of the transfer signal lines 14, desired transfer signal lines 14 can each be secured at a constant voltage. Accordingly, the crosstalk between the transfer signal line 14 and an adjacent signal line can be controlled, thereby lowering the signal charge leakage.

For example, a method of driving the terminal circuit will be described below with reference to a circuit configuration example for carrying out the method in FIGS. 5A, 5B.

DRIVING METHOD EXAMPLE 1

As a driving method example 1, a method of driving the solid-state imaging device 1 including the imaging unit 3 in which the transfer signal lines 14 are adjacently arranged to one another is described with reference to FIGS. 5A, 5B. In FIG. 5A, the same reference numerals are provided to the elements corresponding to those shown in FIG. 2, and duplicated descriptions thereof are omitted.

Figure 5A:
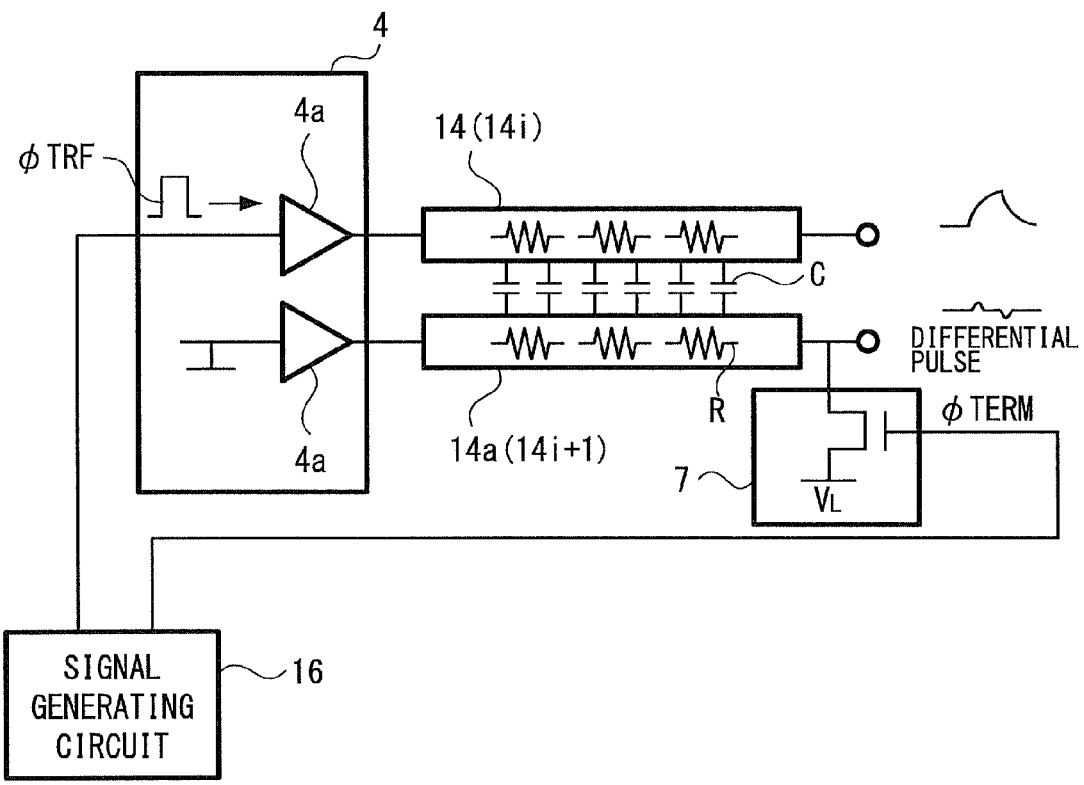
FIGS. 5A, 5B are respectively a schematic configuration diagram for carrying out a driving method example 1, and an operation timing chart therefor.

FIG. 5A is a schematic configuration diagram of major components of the solid-state imaging device 1 which is a circuit configuration for carrying out the driving method example 1. Specifically, FIG. 5A is a schematic diagram illustrating one transfer signal line 14 extended in the row direction of the imaging unit 3, the other transfer signal line 14 (hereinafter referred to as "adjacent transfer signal line 14a") formed adjacent to the transfer signal line 14, and peripheral circuits connected therewith and the adjacent transfer signal line 14a. FIG. 5B is an operation timing chart in the driving method example 1. In FIG. 5A, if a transfer signal line corresponding to the $i^{th}$ row transfer signal line is represented by a transfer signal line $14_i$, an adjacent transfer signal line 14a is represented by a transfer signal line $14_{i+1}$ corresponding to the $i+1^{th}$ row transfer signal line, for example.

One ends of the transfer signal line 14 and adjacent transfer signal line 14a are connected to transfer signal driver circuits 4a in the vertical driver unit 4. The other end of the adjacent transfer signal line 14a is connected to the terminal circuit 7. The terminal circuit 7 includes the same configuration as that described in FIG. 3, and a duplicated description thereof is omitted. Further, desired pulse signals generated by the signal generating circuit 16 are input to the terminal circuit 7 and the vertical driver unit 4.

A line transfer signal φTRF and a control signal φTERM generated by the signal generating circuit 16 are individually input to gates of the transfer signal driver circuits 4a in the vertical driver unit 4 and a gate of the terminal circuit 7. The line transfer signal φTRF and the control signal φTERM are obtained, in practice, by inputting a pulse signal, such as an address signal output from the signal generating circuit 16, into unshown decoders and logic circuits.

In the solid-state imaging device 1, the line transfer signals φTRF input to the transfer signal driver circuits 4a connected to the transfer signal lines 14 and the control signal φTERM input to the terminal circuit 7 are synchronized and output from the signal generating circuit 16.

Figure 5B:
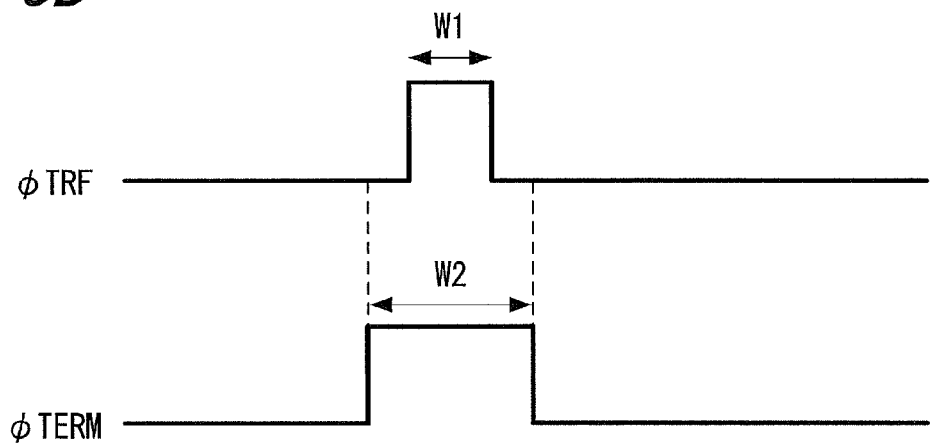

The solid-state imaging device 1 is, as shown in FIG. 5B, configured such that the control signal ϕTERM is input to the terminal circuit 7, and a pulse of the control signal ϕTERM rises up before pulse rise time of the line transfer signal ϕTRF. Likewise, the solid-state imaging device 1 is configured such that the pulse of the control signal ϕTERM falls before pulse fall time of the line transfer signal ϕTRF.

In the solid-state imaging device 1, a pulse width W2 of the control signal ϕTERM input to the terminal circuit 7 is sufficiently longer than a pulse width W1 of the line transfer signal ϕTRF input to the transfer signal driver circuits 4a. With this configuration, even though either one or both of the pulse rise time of the line signal ϕTRF input to the transfer signal driver circuit 4a and the pulse rise time of the control signal ϕTERM input to the terminal circuit 7 are delayed, the pulse of the line signal ϕTRF rises after the pulse rise time of the control signal ϕTERM. Likewise, even though either one or both of the pulse fall time of the line signal ϕTRF and the pulse fall time of the control signal ϕTERM are delayed, the pulse of the line signal ϕTRF falls before the pulse fall time of the control signal ϕTERM.

In the solid-state imaging device having such a configuration, the signal generating circuit 16 outputs the line transfer signal ϕTRF for driving the transfer signal line 14. The signal generating circuit 16, as shown in FIG. 5B, also outputs the control signal ϕTERM, which has been input to the gate of the control transistor Tr5 of the terminal circuit 7 before the line transfer signal ϕTRF is input to the transfer signal line 14. The control transistor Tr5 is then turned ON by the input of the control signal ϕTERM so as to apply low voltage $V_L$ to the adjacent transfer signal line 14a from the terminal circuit 7 side connected with the other end of thereof. In this phase, the signal charge of the adjacent transfer signal line 14a will not be read out. That is, since the adjacent transfer signal line 14a is unselected, the low voltage $V_L$ is also being applied from the vertical driver unit 4 side, in other words, from one end of the adjacent transfer signal line 14a. Accordingly, in a phase where the control transistor Tr5 is being turned ON by the input of the control signal ϕTERM, low voltage $V_L$ is applied from both sides of the adjacent transfer signal line 14a.

After the adjacent transfer signal line 14a has been secured at a constant potential, the line transfer signal ϕTRF is input to the transfer signal line 14. In this manner, when the line transfer signal ϕTRF is about to be input to the transfer signal line 14, the adjacent transfer signal line 14a has already been secured at a constant potential by the application of the low voltage $V_L$, and synchronized potential pulse signal is supplied from both sides thereof. As a result, the resistance R of the adjacent signal line 14a is reduced by approximately ½. Accordingly, the capacitance C created between the transfer signal line 14 and the adjacent transfer signal line 14a can be lowered, thereby also lowering the crosstalk occurred between the transfer signal line 14 and the adjacent transfer signal line 14a at the pulse rise time of the line transfer signal ϕTRF.

Consequently, an adverse effect due to the pulse rise of the line transfer signal ϕTRF, that is, accidental generation of differential pulse that results in generation of an erroneous signal can be controlled in the adjacent transfer signal line 14a. Specifically, signal fluctuation in the adjacent transfer signal line 14a can be inhibited by reliably securing the potential of the adjacent transfer signal line 14a.

In general, if the differential pulse causes the signal fluctuation in the adjacent transfer signal line 14a due to the pulse rise of the line transfer signal ϕTRF in the transfer signal line 14, the gate of the transfer signal line 14a is accidentally turned ON and hence the signal charge may be input thereto.

By contrast, with the driving method example 1, when the line transfer signal ϕTRF is input to the transfer signal line 14, generation of the differential pulse is controlled in the adjacent transfer signal line 14a, thereby inhibiting occurrence of crosstalk. Thus, undesired signal charge leakage to the adjacent transfer signal line 14a can be prevented.

DRIVING METHOD EXAMPLE 2

Figure 6A:
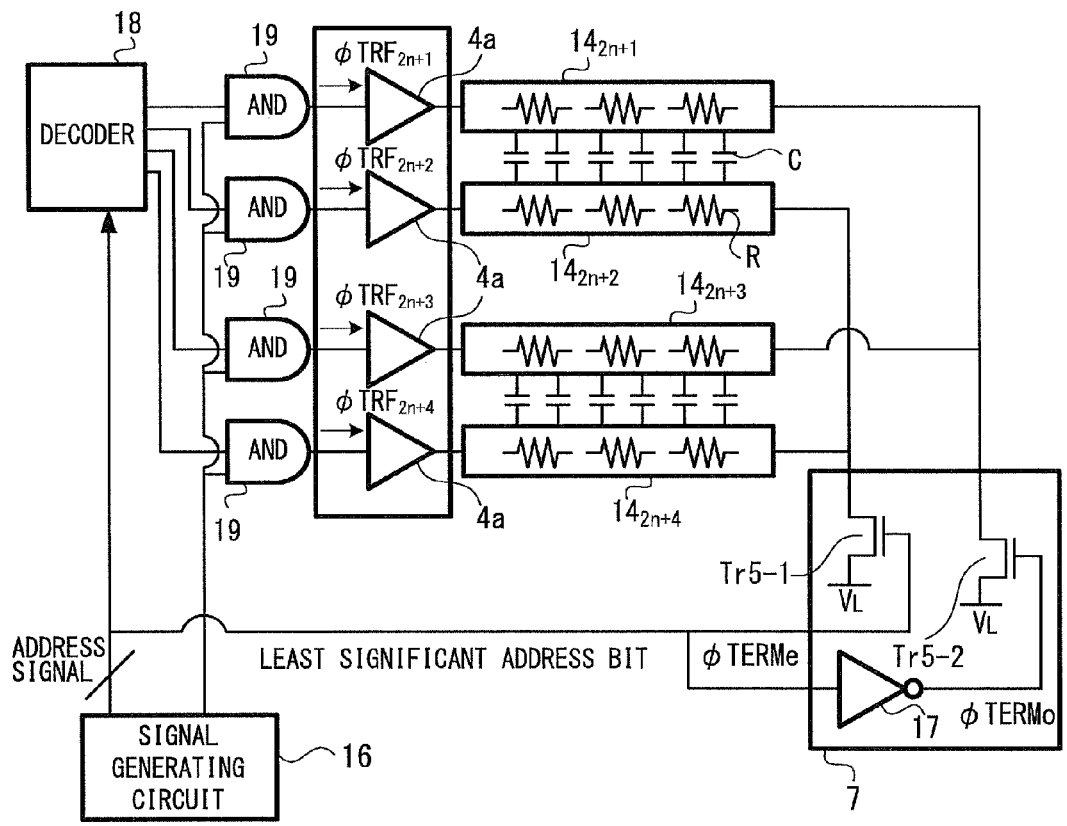
FIGS. 6A, 6B are respectively a schematic configuration diagram for carrying out a driving method example 2, and an operation timing chart therefor.

Next, as a driving method example 2, another method of driving the solid-state imaging device 1 including the imaging unit 3 in which the transfer signal lines 14 are adjacently arranged to one another is described with reference to FIGS. 6A, 6B. In FIG. 6A, the same reference numerals are provided to the elements corresponding to those shown in FIG. 2, and duplicated descriptions thereof are omitted.

FIG. 6A is a schematic configuration diagram of major components of the solid-state imaging device 1 which is a circuit configuration for carrying out the driving method example 2. FIG. 6A shows four signal lines extended in the row direction of the imaging unit 3 in a solid-state imaging device; in which $2n+1^{th}$ line (odd-numbered row) to $2n+4^{th}$ line (even-numbered row) of transfer signal lines 14 are represented by transfer signal lines $14_{(2n+1)}$ to $14_{(2n+4)}$, respectively. FIG. 6B is an operation timing chart in the driving method example 2. In this example, upper two transfer signal lines $14_{(2n+1)}$, $14_{(2n+2)}$ are adjacently arranged, and lower two transfer signal lines $14_{(2n+3)}$, $14_{(2n+4)}$ are adjacently arranged.

One ends of the transfer signal lines $14_{(2n+1)}$ to $14_{(2n+4)}$ are each connected to transfer signal driver circuits 4a in a vertical driver unit 4. The other ends of the transfer signal lines $14_{(2n+1)}$ to $14_{(2n+4)}$ are each connected to a terminal circuit 7. Further, desired pulse signals generated by a signal generating circuit 16 are input to the transfer signal driver circuits 4a and the terminal circuit 7.

Between the signal generating circuit 16 and the transfer signal driver circuits 4a, there are provided a decoder 18 that decodes an address signal generated by the signal generating circuit 16, or a logical AND gate 19 that carries out a logical AND between a pulse signal and the address signal generated by the signal generating circuit 16. The terminal circuit 7 includes a first control transistor Tr5-1 and a second control transistor Tr5-2 each formed of n-channel MOS transistor, and an inverter circuit arranged right in front of the second control transistor Tr5-2. In the terminal circuit 7, a low voltage $V_L$ power supply is connected to sources of the first and second control transistors Tr5-1, Tr5-2. Further, the least significant address bit is input to the gate of the first control transistor Tr5-1, and the transfer signal lines $14_{(2n+2)}$, $14_{(2n+4)}$ in the even-numbered rows are connected to the drain thereof. The least significant address bit is input to the gate of the second control transistor Tr5-2 via the inverter circuit 17, and the transfer signal lines $14_{(2n+1)}$, $14_{(2n+3)}$ in the odd-numbered rows are connected to the drain thereof. Thus, only the address signals output by the signal generating circuit 16 are input to the terminal circuit 7 having the aforementioned configuration.

In the solid-state imaging device having such a configuration, the signal generating circuit 16 inputs a line transfer signal ϕTRF$_{2n+1}$ into the transfer signal line $14_{(2n+1)}$ for driving the transfer signal line $14_{(2n+1)}$, for example. If the least significant bit of the address signal for generating the line transfer signal ϕTRF$_{2n+1}$ input to the transfer signal lines $14_{(2n+1)}$ in the odd-numbered row is "1", a control signal ϕTERMe having 1-bit signal is input to the terminal circuit 7.

Since the terminal circuit 7 includes the first and second transistors Tr5-1, Tr5-2 each formed of n-channel MOS transistor, if the control signal φTERMe is input to the terminal circuit 7, only the gate of the first control transistor Tr5-1 connected to the transfer signal lines $14_{(2n+2)}$, $14_{(2n+4)}$ in the even-numbered rows is turned ON. By contrast, since the inverter circuit 17 is provided right in front the second control transistor Tr5-2 and thus 0-bit signal is input thereto, the gate of the second control transistor Tr5-2 remains turned OFF.

Thus, the low voltage $V_L$ is applied from the terminal circuit 7 side to the transfer signal lines $14_{(2n+2)}$, $14_{(2n+4)}$ in the even-numbered rows. In this phase, since the low voltage $V_L$ is also applied to the transfer signal driver circuits 4a side for the transfer signal lines $14_{(2n+2)}$, $14_{(2n+4)}$ in the even-numbered rows, the potential of the transfer signal lines $14_{(2n+2)}$, $14_{(2n+4)}$ are secured by the application of the low voltage $V_L$ from both sides thereof.

Figure 6B:
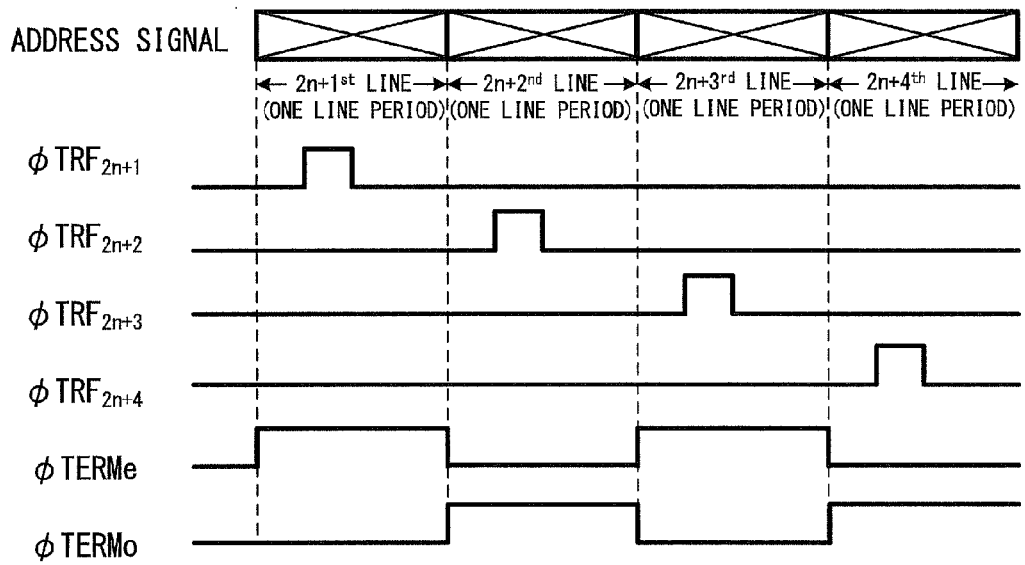

Specifically, as shown in FIG. 6B, while an address signal for generating the line transfer signal φTRF$_{2n+1}$ that drives the transfer signal line $14_{(2n+1)}$ in the odd-numbered row is being supplied, a control signal φTERMe is input to the terminal circuit 7 connected with the transfer signal lines $14_{(2n+2)}$, $14_{(2n+4)}$ in the even-numbered rows. In this phase, the transfer signal lines $14_{(2n+2)}$, $14_{(2n+4)}$ in the even-numbered rows are secured by the application of the low voltage $V_L$ from both sides thereof before the line transfer signal φTRF$_{2n+1}$ is input to the transfer signal line $14_{(2n+1)}$ in the odd-numbered row.

That is, when the line transfer signal φTRF$_{2n+1}$ is about to be input to the transfer signal line $14_{(2n+1)}$ in the odd-numbered row, the transfer signal lines $14_{(2n+2)}$, $14_{(2n+4)}$ in the even-numbered rows have already been secured at the low voltage $V_L$. Further, since synchronized potential pulse signal is applied to both sides of the transfer signal lines $14_{(2n+2)}$, $14_{(2n+4)}$ in the even-numbered rows, the resistance R of each of the transfer signal lines $14_{(2n+2)}$, $14_{(2n+4)}$ is reduced by approximately ½. Accordingly, the capacitance C created between the transfer signal line $14_{(2n+1)}$ in the odd-numbered row and the adjacent transfer signal line $14_{(2n+2)}$ in the even-numbered row can be lowered, thereby also lowering the crosstalk occurred between the transfer signal line $14_{(2n+1)}$ and the adjacent transfer signal line $14_{(2n+2)}$.

As a result, an adverse effect due to the pulse rise of the line transfer signal φTRF$_{2n+1}$ input to the transfer signal line $14_{(2n+1)}$ in the odd-numbered row can be controlled in the transfer signal line $14_{(2n+2)}$ in the even-numbered row adjacent to the transfer signal line $14_{(2n+1)}$ subject to being driven. Specifically, signal fluctuation due to crosstalk can be inhibited by reliably securing the potential of the transfer signal line $14_{(2n+2)}$ in the even-numbered row. Similar operation can be conducted when the line transfer signal φTRF$_{2n+3}$ is input to the transfer signal line $14_{(2n+3)}$ in the odd-numbered row so as to lower the crosstalk between the transfer signal line $14_{(2n+3)}$ and the adjacent transfer signal line $14_{(2n+4)}$ in the even-numbered row.

Conversely, a line transfer signal φTRF$_{2n+2}$ is input into the transfer signal line $14_{(2n+2)}$ for driving the transfer signal line $14_{(2n+2)}$ in the even-numbered row, for example. In this case, since the least significant address bit is "0", 0-bit signal is input to the terminal circuit 7. In a case where "0" is input as a control signal φTERMo, only the signals input as 1-bit signal inverted via an inverter circuit 17 can the n-channel MOS transistor be turned ON, and hence only the second control transistor Tr5-2 connected to the transfer signal lines $14_{(2n+1)}$, $14_{(2n+3)}$ is turned ON. Thus, the low voltage $V_L$ is applied to the transfer signal lines $14_{(2n+1)}$, $14_{(2n+3)}$ in the odd-numbered rows. In this phase, since the low voltage $V_L$ is also applied to the transfer signal driver circuits 4a side for the transfer signal lines $14_{(2n+1)}$, $14_{(2n+3)}$ in the odd-numbered rows, the potential of the transfer signal lines $14_{(2n+1)}$, $14_{(2n+3)}$ are secured by the application of the low voltage $V_L$ from both sides thereof.

Specifically, as shown in FIG. 6B, while an address signal for inputting the line transfer signal φTRF$_{2n+2}$ that drives the transfer signal line $14_{(2n+2)}$ in the even-numbered row is being supplied, a control signal φTERMo is input to the terminal circuit 7 connected with the transfer signal lines $14_{(2n+1)}$, $14_{(2n+3)}$ in the odd-numbered rows. In this phase, the control signals φTERMo are input to the transfer signal lines $14_{(2n+1)}$, $14_{(2n+3)}$ in the odd-numbered rows before the line transfer signal φTRF$_{2n+2}$ is input to the transfer signal line $14_{(2n+2)}$ in the even-numbered row.

That is, when the line transfer signal φTRF$_{2n+2}$ is about to be input to the transfer signal line $14_{(2n+2)}$ in the even-numbered row, the potential of the transfer signal lines $14_{(2n+1)}$, $14_{(2n+3)}$ in the odd-numbered rows have already been secured by the application of the low voltage $V_L$ from both sides thereof.

Accordingly, the resistance R of the transfer signal lines $14_{(2n+1)}$ to $14_{(2n+4)}$ can be reduced by approximately ½. Consequently, the capacitance C created between the transfer signal line $14_{(2n+2)}$ in the odd-numbered row and the transfer signal line $14_{(2n+1)}$ in the even-numbered row adjacent thereto can be lowered, thereby also lowering the crosstalk between the transfer signal line $14_{(2n+1)}$ and the transfer signal line $14_{(2n+2)}$ adjacent thereto.

Similar operation can be conducted when the line transfer signal φTRF$_{2n+4}$ is input to the transfer signal line $14_{(2n+4)}$ in the even-numbered row so as to lower the crosstalk between the transfer signal line $14_{(2n+4)}$ and the adjacent transfer signal line $14_{(2n+3)}$ in the odd-numbered row.

In the solid-state imaging device 1, the transfer signal lines 14 are generally aligned in the order of being selected. Therefore, if the transfer signal lines 14 subject to being selected are in the odd-numbered rows, the transfer signal lines 14 in the even-numbered rows are all secured at a constant potential whereas if the transfer signal lines 14 subject to being selected are in the even-numbered rows, the transfer signal lines 14 in the odd-numbered rows are all secured at a constant potential. Accordingly, even though the transfer signal lines 14 are placed adjacent to one another, the crosstalk occurred therebetween can be inhibited.

In this driving method, the crosstalk is inhibited not only between the transfer signal lines that are adjacently arranged to one another in the solid-state imaging device, but is also inhibited between the transfer signal lines and one of the selection signal lines 15 and reset signal lines 13 that are arranged in different line blocks. For example, in order to prevent signal fluctuation from occurring in the transfer signal lines in the even-numbered rows due to the pulse rise of the selection signal lines 15 or reset signal lines 13 in the odd-numbered rows, a constant potential is secured by the application of low voltage to both sides of each of the transfer signal lines 14 in the even-numbered rows. In this case, the least significant bit of the address signal is input as a control signal φTERM to the terminal circuit 7 shown in FIG. 6.

In the driving method 2, one set of the transfer signal line in the odd-numbered row and that in the even-numbered row is described as an example in which one of the transfer signal lines 14 are secured at a constant potential; however, the driving method 2 is not limited thereto. When the line transfer signal φTRF is input to the transfer signal line in the odd-numbered row or even-numbered row, the transfer signal lines 14 in either odd-numbered rows or those in the even-numbered rows that sandwich the transfer signal line 14 supplied with the line transfer signal φTRF are each secured at a constant potential. That is, the crosstalk occurred in the adjacent transfer signal lines that sandwich the transfer signal line 14 supplied with the line transfer signals φTRF can be controlled.

DRIVING METHOD EXAMPLE 3

Figure 7A:
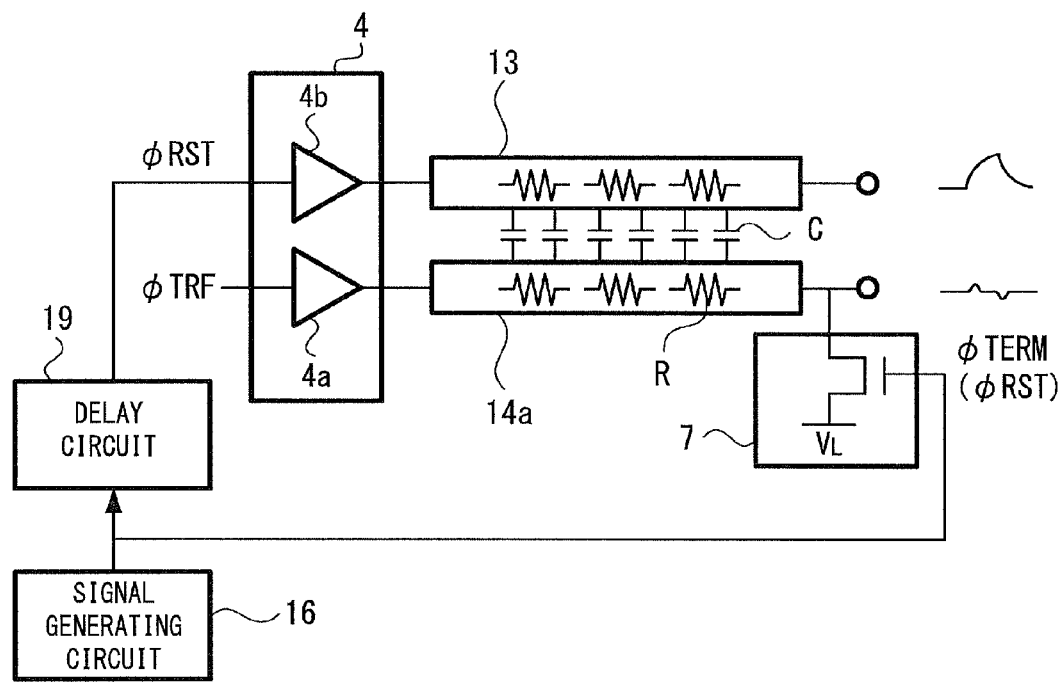
FIGS. 7A, 7B are respectively a schematic configuration diagram for carrying out a driving method example 3, and a timing chart therefor.
Figure 7B:
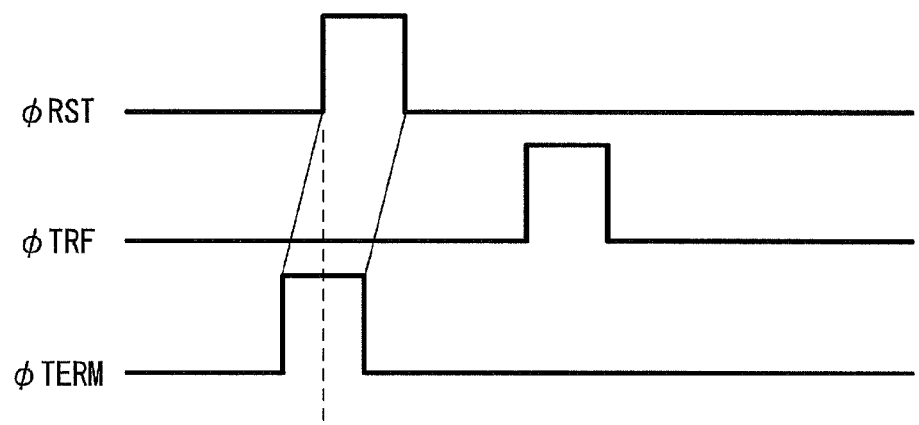

Next, as a driving method example 3, still another method of driving the solid-state imaging device 1 including the imaging unit 3 in which the reset signal lines and the transfer signal lines 14 are adjacently arranged to one another is described with reference to FIGS. 7A, 7B. In FIGS. 7A, 7B, the same reference numerals are provided to the elements corresponding to those shown in FIG. 2, and duplicated descriptions thereof are omitted.

FIG. 7A is a schematic configuration diagram of major components of the solid-state imaging device 1 which is a circuit configuration for carrying out the driving method example 3. FIG. 7A is a schematic diagram illustrating the reset signal line 13 extended in the row direction of the imaging unit 3, and the transfer signal line 14 adjacent to the reset signal line 13 in the same line block, and peripheral circuits connected to the reset signal line 13 and transfer signal line 14. FIG. 7B is an operation timing chart in the driving method example 3.

One ends of the reset signal line 13 and the transfer signal line 14 are connected to respective reset signal driver circuit 4b and transfer signal driver circuit 4a in the vertical driver unit 4. The other end of the transfer signal line 14 is connected to the terminal circuit 7. The terminal circuit 7 includes the same configuration as that described in FIG. 3, and a duplicated description thereof is omitted. The line transfer signal φTRF and control signal φTERM generated by the signal generating circuit 16 are input to gates of the transfer signal driver circuits 4a in the vertical driver unit 4 and a gate of the terminal circuit 7.

The line transfer signal φTRF and the control signal φTERM are obtained, in practice, by inputting a pulse signal, such as an address signal output from the signal generating circuit 16, into unshown decoders and logic circuits.

The line reset signal φRST and the line transfer signal φTRF may not have to be input thereto at the same time. In order to inhibit the crosstalk occurred due to the line reset signal φRST in the transfer signal line 14 adjacent to the reset signal line 13, the transfer signal line 14 may only have to be secured at a constant potential. That is, redundant signal charge leakage in the transfer signal line 14 can be lowered by only controlling coupling in a normal direction.

Thus, in the driving method example 3, the line reset signal φRST output from the signal generating circuit 16 is input to the reset signal driver circuit 4b via a delay circuit 19, and line reset signal φRST is input to the terminal circuit 7 without delay as the control signal φTERM.

In the solid-state imaging device having such a configuration, the signal generating circuit 16 outputs the line reset signal φRST for driving the reset signal line 13. The signal generating circuit 16, as shown in FIG. 7B, also outputs the control signal φTERM, which has been input to the gate of the control transistor Tr5 of the terminal circuit 7 before the line reset signal φRST is input to the transfer signal line 14. The control transistor Tr5 is then turned ON by the input of the control signal φTERM so as to apply low voltage $V_L$ to the transfer signal line 14 from the terminal circuit 7 side. In this phase, the line transfer signal φTRF is yet to be input to the transfer signal line 14, and hence the low voltage $V_L$ is still applied to the transfer signal line 14 from the vertical driver unit 4 side. That is, in a phase where the control transistor Tr5 is being turned ON by the input of the control signal φTERM, the low voltage $V_L$ is applied from both sides of the transfer signal line 14.

The line reset signal φRST is input to the reset signal line 13 after the transfer signal line 14 is secured at a constant potential by the application of the low voltage $V_L$. In this manner, when the line reset signal φRST is about to be input to the reset signal line 13, the transfer signal line 14 has already been secured at a constant potential by the application of the low voltage $V_L$, and synchronized potential pulse signal is supplied from both sides thereof. As a result, the resistance R of the signal line 14 is reduced by approximately ½. Thus, the capacitance created between the reset signal line 13 and the transfer signal line 14 can be lowered and the crosstalk of the signal between the reset signal line 13 and the transfer signal line 14 can also be reduced. Consequently, an adverse effect due to the pulse rise of the line reset signal φRST, that is, accidental generation of differential pulse can be reduced in the transfer signal line 14. Specifically, signal fluctuation due to the crosstalk in the signal line 14 can be inhibited by reliably securing the transfer signal line 14 at a constant potential.

In general, if the differential pulse causes the signal fluctuation in the transfer signal line 14 due to the pulse rise of the line transfer signal φTRF of the transfer signal line 14, the gate of the transfer signal line 14 is accidentally turned ON and the signal charge may be input thereto. By contrast, with the driving method example 4, when the line reset signal φRST is input to the reset signal line 13, generation of the differential pulse is controlled in the transfer signal line 14 adjacent to the reset signal line 13, thereby inhibiting occurrence of crosstalk. Thus, undesired signal charge leakage to the transfer signal line 14 can be prevented.

In this example, since the low voltage $V_L$ is not applied to the transfer signal line 14 from the terminal circuit 7 side at the pulse fall time of the line reset signal φRST, the potential of transfer signal line 14 in OFF-state is further lowered due to the effect of the pulse fall of the line reset signal φRST. Thus, the signal charge will not leak to the transfer signal line 14.

DRIVING METHOD EXAMPLE 4

Figure 8:
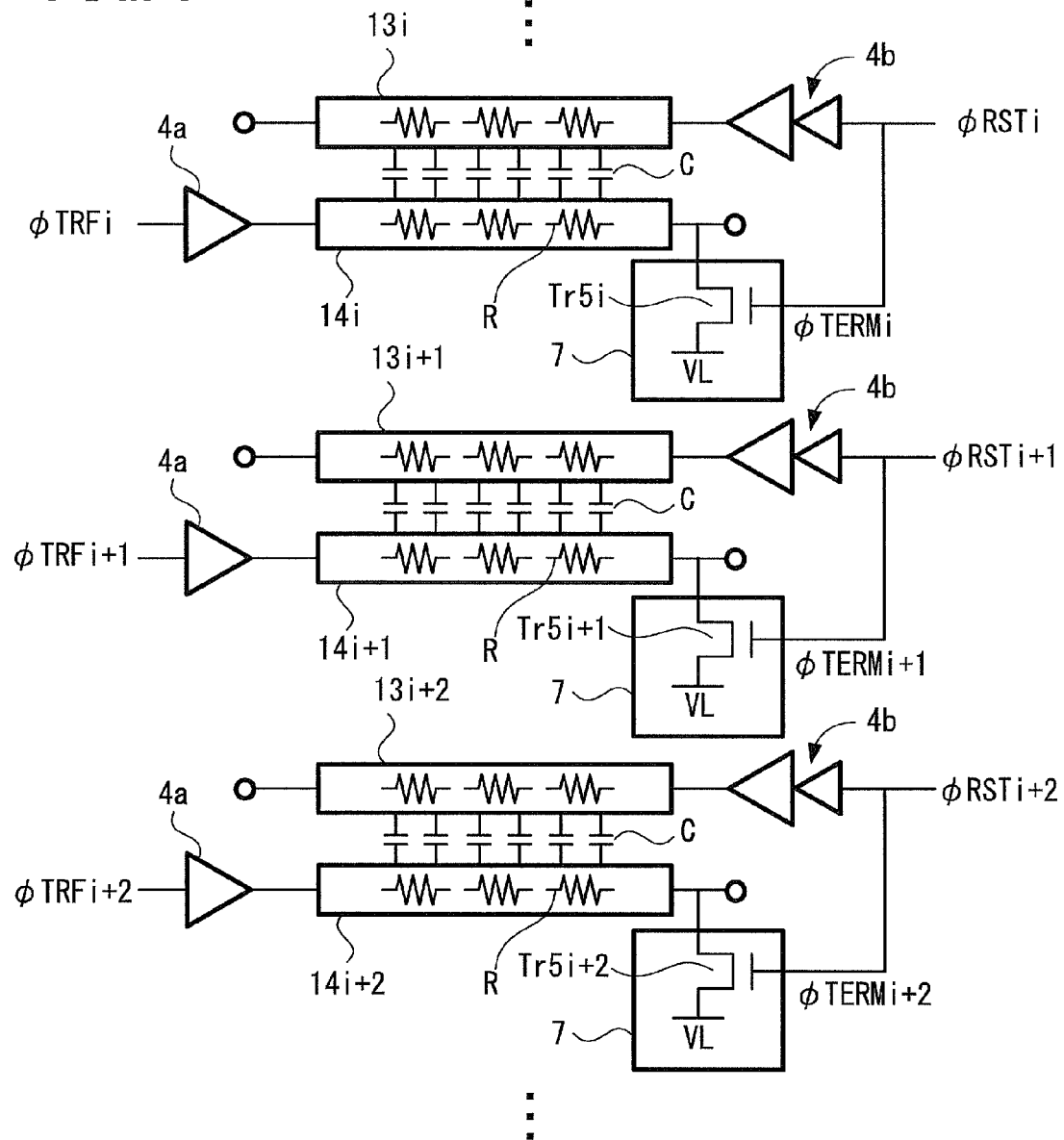
FIG. 8 is a schematic configuration diagram for carrying out a driving method example 4.

Next, as a driving method example 4, still another method of driving the solid-state imaging device 1 including the imaging unit 3 in which the reset signal lines and the transfer signal lines 14 are adjacently arranged to one another is described with reference to FIG. 8. In FIG. 8, the same reference numerals are provided to the elements corresponding to those shown in FIG. 2, and duplicated descriptions thereof are omitted.

FIG. 8 is a schematic configuration diagram of major components of the solid-state imaging device 1 which is a circuit configuration for carrying out the driving method example 4. FIG. 8 is a schematic diagram of the solid-state imaging device 1 including the imaging unit 3 in which three reset signal lines $13_i$ to $13_{i+2}$ and three transfer signal lines $14_i$ to $14_{i+2}$ are adjacently arranged to one another in the same line block. In addition, FIG. 8 schematically shows peripheral circuits connected to the reset signal lines $13_i$ to $13_{i+2}$ and the transfer signal lines $14_i$ to $14_{i+2}$.

One ends of the transfer signal lines $14_i$ to $14_{i+2}$ are each connected to the transfer signal driver circuits 4a and the other ends thereof are each connected to the terminal circuits 7. The reset signal driver circuits 4b are connected to ends opposite to the ends of the reset signal lines $13_i$ to $13_{i+2}$ to which the transfer signal driver circuits 4a for driving the transfer signal lines $14_i$ to $14_{i+2}$ are connected. The terminal circuits 7 in this example each include the same configuration as that described in FIG. 3, and duplicated descriptions thereof are omitted.

In the solid-state imaging device 1 including such a configuration, line reset signals $\phi RST_i$ to $\phi RST_{i+2}$ in the same line block are input as control signals $\phi TERM_i$ to $\phi TERM_{i+2}$ to the gates of the control transistors $Tr5_i$ to $Tr5_{i+2}$ each forming one of the terminal circuits 7. The reset signal driver circuits 4b are each configured to delay the line reset signals $\phi RST_i$ to $\phi RST_{i+2}$ input thereto. In this manner, the line reset signals $\phi RST_i$ to $\phi RST_{i+2}$ and control signals $\phi TERM_i$ to $\phi TERM_{i+2}$ similar to the line reset signals $\phi RST$ and control signals $\phi TERM$ in the driving method 3 can be obtained. Thus, an effect similar to that in the driving method 3 can be obtained.

Signal generation time can easily be controlled if the solid-state imaging device can be configured such that the driver circuits (reset signal driver circuits 4b in this example) supplied with the desired signals and the transfer signal driver circuits 4a for each driving the desired transfer signal lines 14 subject to crosstalk are mutually arranged at the opposite sides of a matrix of the pixels 2. That is, with this configuration, since the signal driver circuits 4b and the terminal circuits 7 connected with the transfer signal lines 14 subject to control are closely arranged with one another in comparison to the arrangements of those in the aforementioned driving method examples, the signal delay due to the length of the signal lines may not interfere in closely arranging the signal driver circuits 4b and the terminal circuits 7.

The solid-state imaging device 1 with this configuration used in this driving method 4 can also be used in the driving method 1 and driving method 2.

DRIVING METHOD EXAMPLE 5

Figure 1:
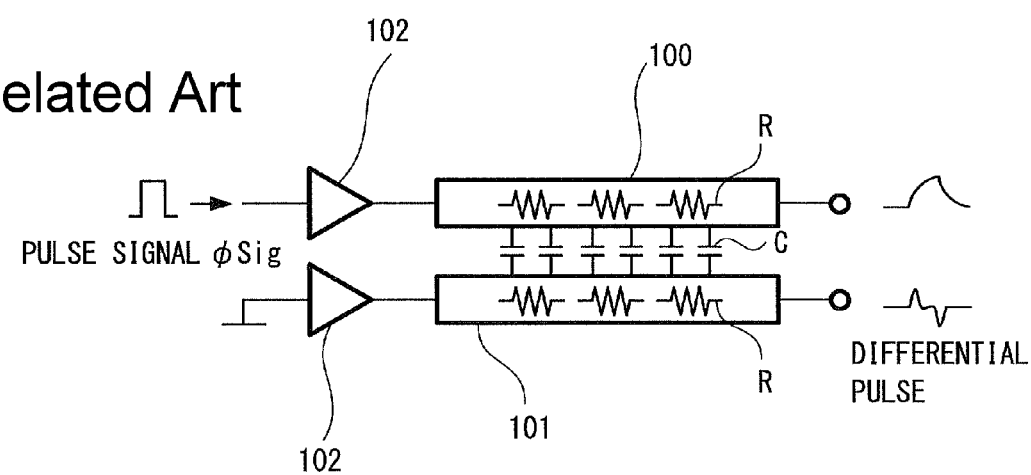
FIG. 1 is a schematic configuration diagram showing main components of a solid-state imaging device according to the related art.
Figure 9A:
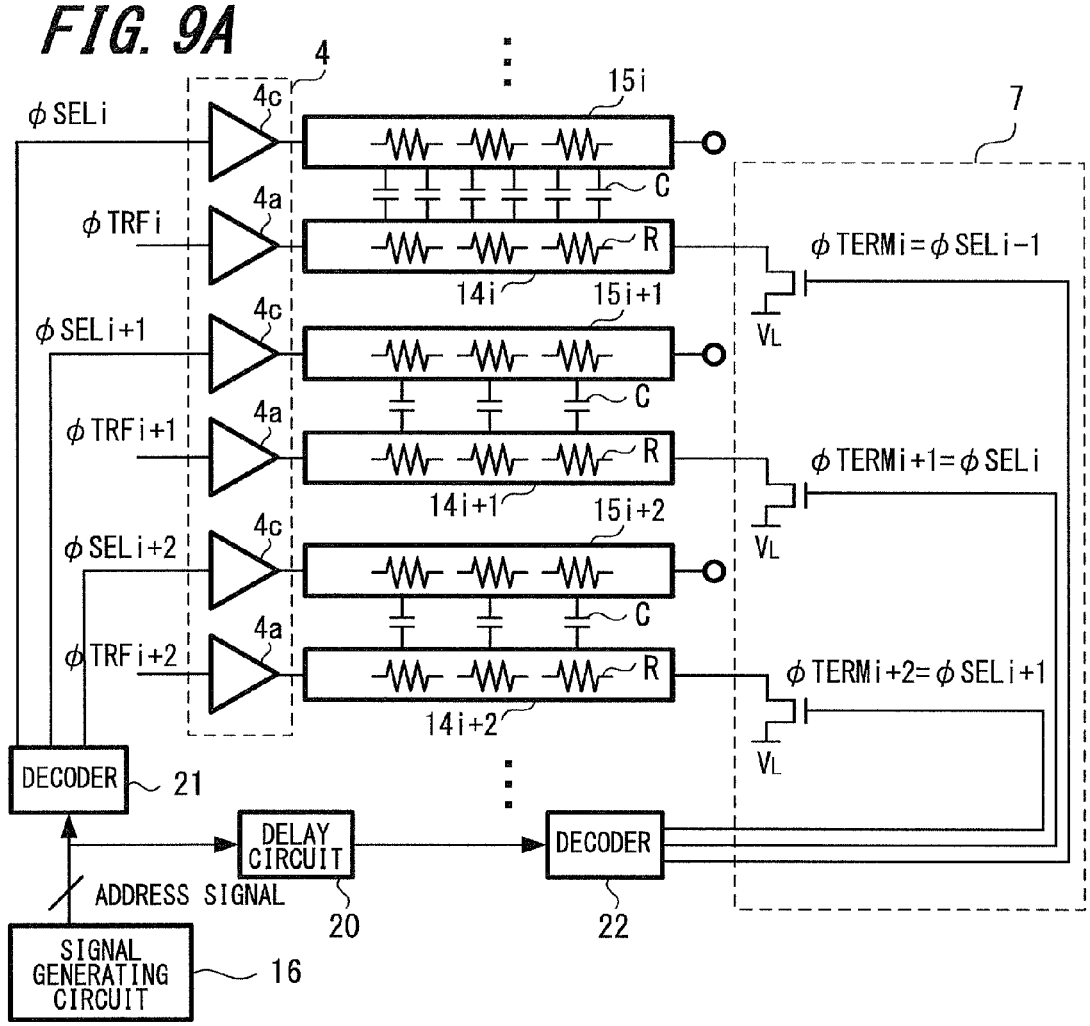
FIGS. 9A, 9B are respectively a schematic configuration diagram for carrying out a driving method example 5, and an operation timing chart therefor.
Figure 9B:
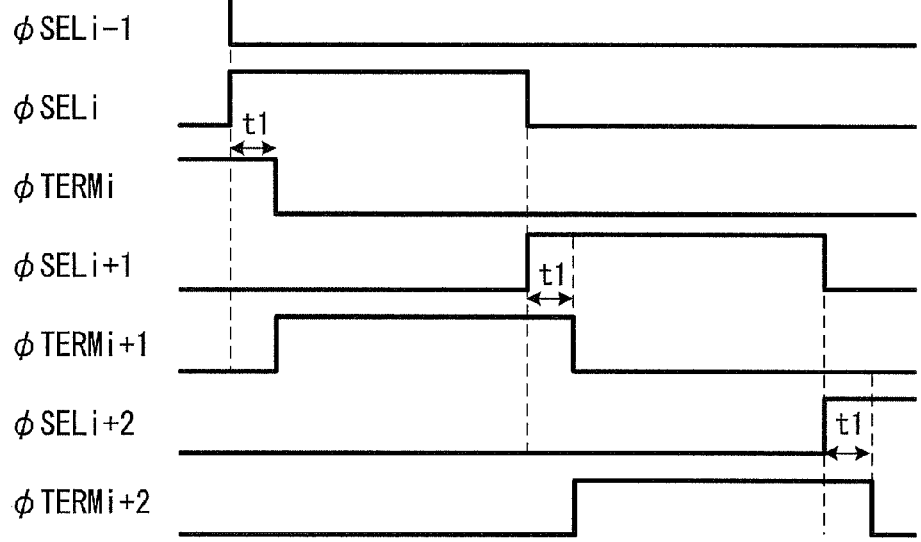

Next, as a driving method example 5, still another method of driving the solid-state imaging device 1 including the imaging unit 3 in which the selection signal lines and the transfer signal lines 14 are adjacently arranged to one another is described with reference to FIGS. 9A, 9B. In FIGS. 9A, 9B, the same reference numerals are provided to the elements corresponding to those shown in FIG. 1, and duplicated descriptions thereof are omitted.

FIG. 9A is a schematic configuration diagram of major components of the solid-state imaging device 1 which is a circuit configuration for carrying out a driving method example 5. FIG. 9A is a schematic diagram of the solid-state imaging device 1 including the imaging unit 3 in which three selection signal lines $15_i$ to $15_{i+2}$ and three transfer signal lines $14_i$ to $14_{i+2}$ are arranged adjacent one another in the same line block. In addition, FIG. 9A schematically shows peripheral circuits connected to the selection signal lines $15_i$ to $15_{i+2}$ and the transfer signal lines $14_i$ to $14_{i+2}$. FIG. 9B is an operation timing chart in the driving method example 5.

One ends of the transfer signal line $14_i$ to $14_{i+2}$ and selection signal lines $15_i$ to $15_{i+2}$ are connected to respective transfer signal driver circuits 4a, 4c in the vertical driver unit 4. The other ends of the transfer signal lines $14_i$ to $14_{i+2}$ are connected to the terminal circuits 7.

Line selection signals $\phi SEL_i$ to $\phi SEL_{i+2}$ for driving the selection signal lines $15_i$ to $15_{i+2}$ are input to the transfer signal driver circuits 4c in the vertical driver unit 4. The line selection signals $\phi SEL_i$ to $\phi SEL_{i+2}$ are obtained by decoding the address signals generated by the signal generating circuit 16 and output via a decoder 21. Line transfer signals $\phi TRF_i$ to $\phi TRF_{i+2}$ are also generated by the signal generating circuit 16 and input to the transfer signal driver circuits 4a; however, detailed descriptions thereof are omitted.

The terminal circuit 7 includes control transistors $Tr5_i$ to $Tr5_{i+2}$, sources of which are each connected to the low voltage $V_L$ power source. Control signals $\phi TERM_i$, $\phi TERM_{i+2}$ are input to gates of the control transistors $Tr5_i$ to $Tr5_{i+2}$. The line selection signals $\phi TERM_i$ to $\phi TERM_{i+2}$ are obtained by decoding the address signals generated by the signal generating circuit 16 and output via a delay circuit 20 and a decoder 22. Drains of the control transistors $Tr5_i$ to $Tr5_{i+2}$ are connected to the transfer signal lines $14_i$ to $14_{i+2}$. The decoder 22 inputs the line selection signals $\phi SEL$ received from a line before one of the currently driving the line transfer signal lines $14_i$ to $14_{i+2}$ to one of the control transistors $Tr5_i$ to $Tr5_{i+2}$ connected with the currently driving line transfer signal lines $14_i$ to $14_{i+2}$.

The solid-state imaging device having such a configuration in which the selection signal line $15_i$ is driven is described below. As can be clear from FIG. 9B, the line selection signal $\phi SEL_{i-1}$ for driving the selection signal line $15_i$ in the previous line, not shown in FIG. 9A, is delayed by a time period t1 and input to the gate of the control transistor $Tr5_i$. That is, the line selection signal $\phi SEL_{i-1}$ in the previous line is input to the gate of the control transistor $Tr5_i$ as the control signal $\phi TERM_i$.

In this manner, when the line selection signal $\phi SEL_i$ is about to be input to the selection signal line $15_i$, the transfer signal line $14_i$ adjacent to the selection signal line $15_i$ has already been secured at a constant potential by the application of the low voltage $V_L$ from both sides thereof. Accordingly, since synchronized potential pulse signals are supplied to the transfer signal line $14_i$ from both sides thereof, the resistance R of the transfer signal line $14_i$ can be reduced by approximately ½. Thus, the capacitance C created between the selection signal line $15_i$ and the transfer signal line $14_i$ can be lowered and the crosstalk between the selection signal line $15_i$ and the transfer signal line $14_i$ can also be lowered. Consequently, an adverse effect due to the pulse rise of the line selection signal $\phi SEL_i$, that is, accidental generation of differential pulse can be reduced in the transfer signal line $14_i$. Specifically, signal fluctuation due to the crosstalk in the signal line $14_i$ can be inhibited by reliably securing the transfer signal line $14_i$ at a constant potential.

Similar operation can be conducted when the line selection signals $\phi SEL_{i+1}$, $\phi SEL_{i+2}$ are input to other selection signal lines $15_{i+1}$, $15_{i+2}$ so as to lower the crosstalk between the transfer signal line $14_{i+1}$, $14_{i+2}$.

Further, in a case where an inverting circuit is provided right behind the delay circuit 20, the line selection signals $\phi SEL$ in the same line block can be used as the control signals $\phi TERM$.

[Effect of First Embodiment]

In the solid-state imaging device according to the first embodiment of the invention, erroneous signal can be prevented from being input into the transfer signal line using the aforementioned driving method examples 1 to 5, in which constant voltage is applied to one ends of the transfer signal lines for a predetermined period from the terminal circuit. With this configuration, a solid-state imaging device capable of inhibiting signal fluctuation of output pixel signals can be obtained. With this configuration, since almost no adverse effect is imposed upon signal transition, rates of signal transition may not be lowered.

In particular, the CMOS type solid-state imaging device (CMOS image sensor) according to the first embodiment employs a sequential access system in which the signal charges are sequentially read out for each line and the rates of reading out the charges are not so fast. Accordingly, it may not be so difficult to control the terminal circuit 7 as compared to a normal LSI, a memory, and the like.

In the aforementioned examples, the solid-state imaging device is configured such that the crosstalk occurred in the signal line adjacent to the signal line to which the desired signals are input is lowered; however, the signal lines and the transfer signal lines may either be arranged in the same plane or different planes to obtain the same effect. That is, the crosstalk occurred between the signal lines and the transfer signal lines formed in the different layers of a multilayer wiring substrate can effectively be inhibited.

Next, another configuration example of the solid-state imaging device that can utilize the driving method examples 1 to 5 is described.

[Second Embodiment]

Figure 10:
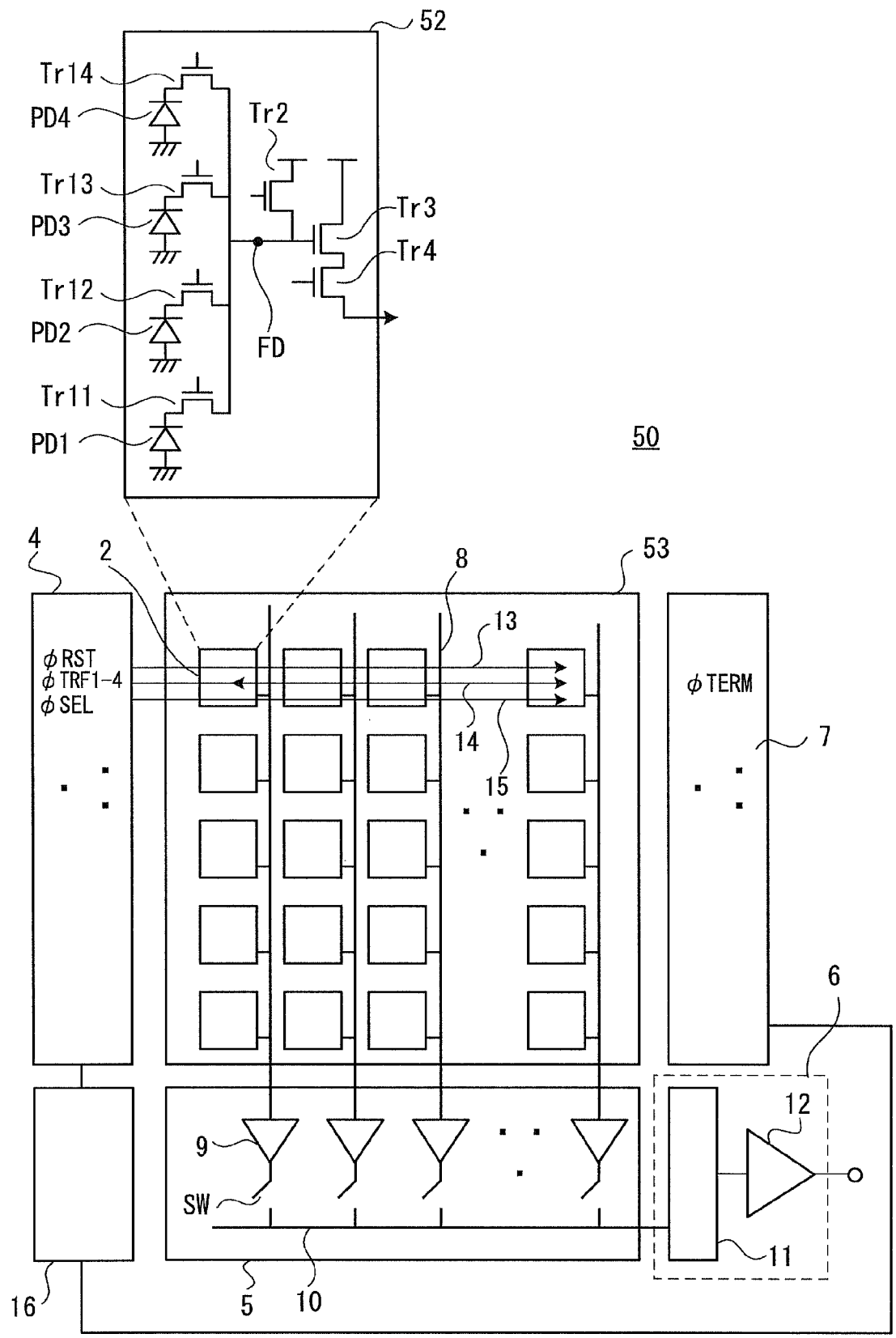
FIG. 10 is a schematic diagram of a solid-state imaging device according to the second embodiment of the invention.

FIG. 10 is a schematic diagram of a solid-state imaging device according to the second embodiment of the invention.

In the solid-state imaging device 50 according to the second embodiment, four pixels share pixel transistors other than the transfer transistors, and the pixels between which the pixel transistor is shared is hereinafter called common pixels. Specifically, each of the common pixels includes four photodiodes that are used as photoelectric conversion elements. In FIG. 10, the same reference numerals are provided to the elements corresponding to those shown in FIG. 2, and duplicated descriptions thereof are omitted.

The solid-state imaging device 50 according to the second embodiment includes an imaging unit 53 (i.e., pixel unit), in which a plurality of common pixels 52 are regularly arranged in a 2-dimensional matrix, and peripheral circuits arranged in the periphery of the imaging unit 53. The peripheral circuits include a vertical driver unit 4, a horizontal transfer unit 5, a terminal circuit 7, a signal generating circuit 16, and an output unit 6. The common pixels 52 in the second embodiment each include four photodiodes PD1 to PD4 that are photoelectric conversion elements, four pixel transistors Tr11 to Tr14, a reset transistor Tr2, an amplifier transistor Tr3, and a selection transistor Tr4.

In the common pixel 52, as shown in FIG. 10, the four photodiodes PD1, PD2, PD3, PD4 are connected to sources of corresponding four transistors Tr11, Tr12, Tr13, Tr14. Drains of the four transfer transistors Tr11 to Tr14 are connected to a source of the reset transistor Tr2. A common floating diffusion FD region used as an electric charge-voltage conversion unit between the transfer transistors Tr11 to Tr14 and the reset transistor Tr2 is connected to a gate of the amplifier transistor Tr3. A source of the amplifier transistor Tr3 is connected to a drain of the selection transistor Tr4. Drains of the reset transistor Tr2 and the amplifier transistor Tr3 are connected to a power-supply voltage supply unit. A source of the selection transistor Tr4 is connected to the vertical signal line 8.

Gates of the transfer transistor Tr11 to Tr14 are supplied with line transfer signals φTRF1 to φTRF4. The gate of the reset transistor Tr2 is supplied with the line reset signal φRST. The gate of the selection transistor Tr4 is supplied with the line selection signal φSEL.

The vertical driver 4, the horizontal transfer unit 5, the output unit 6, the terminal circuit 7, and the signal generating circuit 16 in this example include the same configurations as those described in FIG. 2, and duplicated descriptions thereof are omitted.

A schematic configuration of the common pixel 52 including the four photodiodes PD1 to PD4 and transfer transistors Tr11 to Tr14 in the case where four pixels share the pixel transistors other than the transfer transistors is described.

Figure 11:
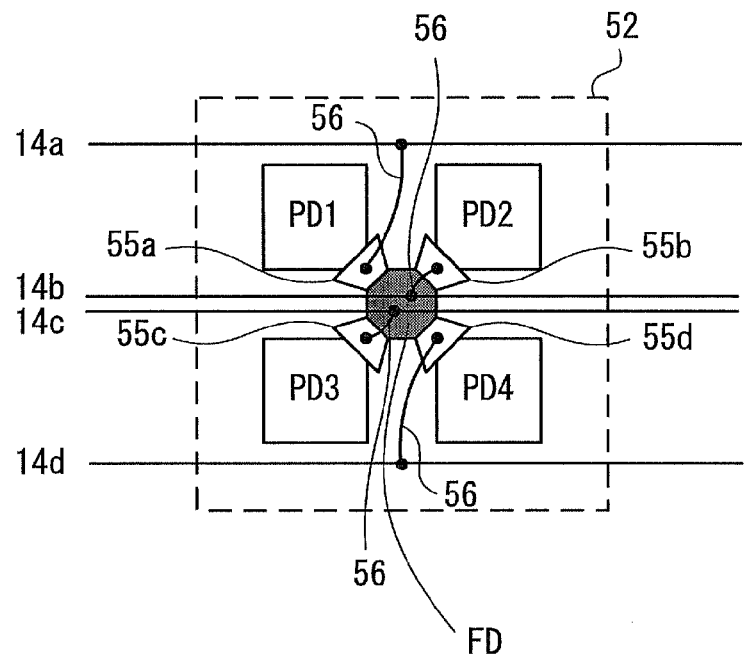
FIG. 11 is a layout of major components of the solid-state imaging device according to a second embodiment of the invention.

FIG. 11 shows a layout of major components of the solid-state imaging device according to the second embodiment of the invention. As shown in FIG. 11, four photodiodes PD1 to PD4 forming the common pixels 52 are arranged in a 2-dimensional matrix. The floating diffusion FD region is provided in the center of the four photodiodes PD1 to PD4 commonly connected thereto. The transfer gates 55a, 55b, 55c, 55d of the transfer transistors Tr11 to Tr14 are provided in boundaries between the photodiodes PD1 to PD4 and the floating diffusion FD region.

The transfer signal lines 14a, 14b, 14c, 14d are respectively connected to the transfer gates 55a, 55b, 55c, 55d. In this case, distances between the photodiodes PD1 to PD4 adjacently arranged are narrow, so that two transfer signal lines 14 extended in the row direction are arranged in regions therebetween, for example.

As shown in FIG. 11, the transfer signal lines 14a, 14b, 14c, 14d are arranged in the reading order of the photodiodes PD1 to PD4; that is, in the order of supplying the line transfer signals φTRF to the transfer gates 55a, 55b, 55c, 55d of the transfer transistor Tr11 to Tr14. In the common pixel 52, the transfer signal lines 14a, 14d are arranged outside in the vertical direction of the photodiodes PD1 to PD 4 so as to be connected with the transfer gates 55a, 55d respectively, using the connection signal lines 56. The transfer signal lines 14b, 14c connected with the transfer gates 55b, 55c using the connection signal lines 56 are arranged between the photodiodes PD1, PD2 and the photodiodes Pd3, PD4, which are arranged outside in the vertical direction of the photodiodes PD1 to PD 4 in the common pixel 52. In FIG. 11, other signal lines and the like are omitted.

In the solid-state imaging device 50, first, when the line transfer signal φTRF1 is input to the transfer signal line 14a, a signal charge is read out of the photodiode PD1 to the floating diffusion FD region to be transferred via the vertical signal line 8. Second, when the line transfer signal φTRF2 is input to the transfer signal line 14b, a signal charge is read out of the photodiode PD2 to the floating diffusion FD region to be transferred via the vertical signal line 8. Likewise, when the line transfer signals φTRF3, φTRF4 are sequentially input to the transfer signal lines 14c, 14d, accumulated signal charges are read out of the photodiodes PD3, PD4 to the floating diffusion FD region.

As can be clear from FIG. 11, in the solid-state imaging device, one floating diffusion FD region is shared by the four photodiodes PD1 to PD4. Accordingly, the gates of the transfer transistors Tr11 to Tr14 are closely arranged. In addition, since distances between the adjacent photodiodes PD are narrow, distances between 14a, 14b, 14c, 14d are narrow. In such a configuration, the above-described crosstalk is occurred.

The solid-state imaging device 50 according to the second embodiment includes the circuit configuration used in the driving method examples 1 and 2, and a control signal φTERM is input to the terminal circuit 7. Thus, the crosstalk occurred between the adjacent transfer signal lines 14 (i.e., 14a, 14b, 14c, 14d) can be inhibited.

[Third Embodiment]

Figure 12:
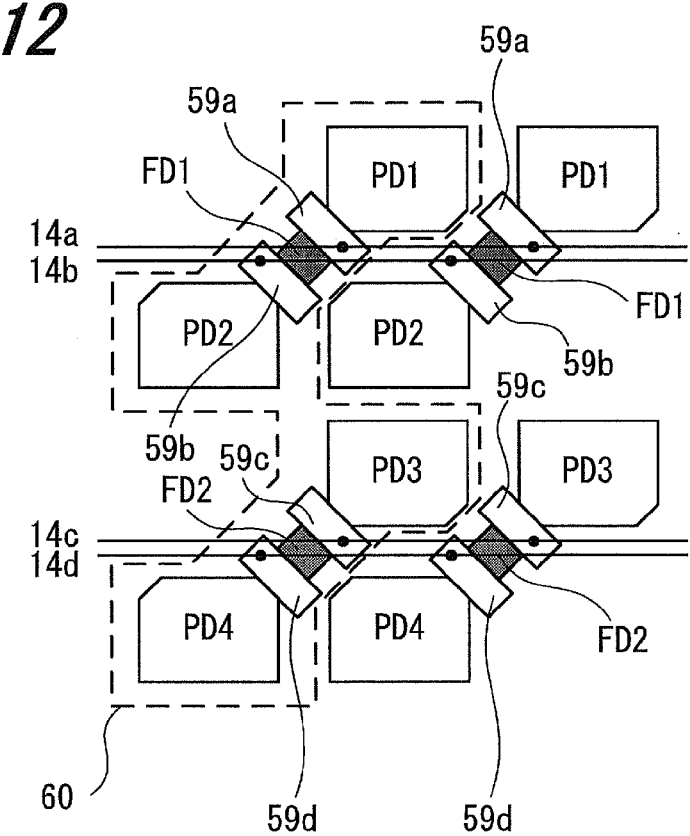
FIG. 12 is a layout of major components of the solid-state imaging device according to a third embodiment of the invention.

FIG. 12 is a layout of major components of the solid-state imaging device according to the third embodiment of the invention. The solid-state imaging device in this example include the same overall circuit configuration as that described in FIG. 2, and a duplicated description thereof is omitted. In FIG. 12, the same reference numerals are provided to the elements corresponding to those shown in FIG. 11, and duplicated descriptions thereof are omitted.

In the solid-state imaging device of the third embodiment, one floating diffusion FD1 region is shared by the diagonally adjoined photodiodes PD1 and PD2 of the photodiodes PD1 to PD4 arranged in a 2-dimensional matrix. Further, one floating diffusion FD2 region is shared by the photodiodes PD3 alternately adjoined to the photodiodes PD1 in the column direction and the photodiodes PD4 alternately adjoined to the photodiodes PD2 in the column direction. Thus, one common pixel 60 includes the diagonally adjoined photodiodes PD1 to PD4.

The transfer gates 59a, 59b, 59c, 59d of the transfer transistors Tr11 to Tr14 are provided between one of the photodiodes PD1 to PD4 and one of the floating diffusion FD1, FD2 regions.

The transfer signal lines 14a, 14b, 14c, 14d are respectively connected to the transfer gates 59a, 59b, 59c, 55d. In this configuration, the transfer signal lines 14a and 14b are provided between the photodiodes PD1 and PD2 whereas the transfer signal lines 14c and 14d are provided between the photodiodes PD3 and PD4. In FIG. 12, other signal lines and the like are omitted.

In the solid-state imaging device, when the line transfer signal φTRF1 is input to the transfer signal line 14a, a signal charge is read out of the photodiode PD1 to the floating diffusion FD1 region to be transferred via the vertical signal line 8. Second, when the line transfer signal φTRF2 is input to the transfer signal line 14b, a signal charge is read out of the photodiode PD2 to the floating diffusion FD1 region to be transferred via the vertical signal line 8. Likewise, the line transfer signals φTRF3, φTRF4 are sequentially input to the transfer signal lines 14c, 14c, respectively. The signal charges accumulated in the photodiodes PD3, PD4 are read out of the floating diffusion FD2 regions to be transferred via the vertical signal line 8.

In the solid-state imaging device 50 of the third embodiment, since one floating diffusion FD1, FD2 regions is shared by two of the photodiodes PD1, PD2 and the photodiodes PD3, PD4, the transfer gates 59a, 59b, 59c, 59d provided are adjacently arranged to one another. Thus, since distances between the transfer signal lines 14 (i.e., 14a, 14b, 14c, 14d) get narrower short, the aforementioned crosstalk will occur therebetween.

The solid-state imaging device 50 according to the third embodiment includes the circuit configuration used in the driving method examples 1 and 2, and a control signal φTERM is input to the terminal circuit 7. Thus, the crosstalk occurred between the adjacent transfer signal lines 14 (i.e., 14a, 14b, 14c, 14d) can be inhibited.

[Fourth Embodiment]

Figure 13:
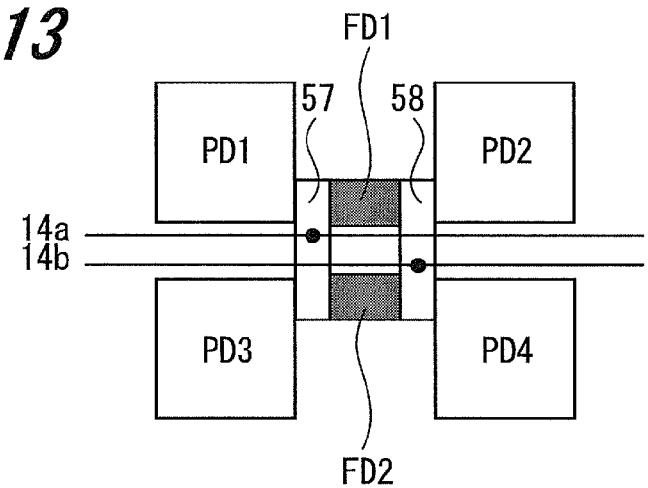
FIG. 13 is a layout of major components of the solid-state imaging device according to a fourth embodiment of the invention.

FIG. 13 is a layout of major components of the solid-state imaging device according to the fourth embodiment of the invention. In the solid-state imaging device according to the fourth embodiment, in the photodiodes PD1 to PD4 arranged in a 2-dimensional matrix, the floating diffusion FD1 region is shared by the photodiodes PD1, PD2 adjacently arranged in the row direction whereas the floating diffusion FD2 region is shared by the photodiodes PD3, PD4 adjacently arranged in the row direction. The transfer gate 57 is shared by the photodiodes PD1 and PD3 adjacently arranged in the column direction whereas the transfer gate 58 is shared by the photodiodes PD2 and PD4 adjacently arranged in the column direction. The transfer gate 57 is connected with the transfer signal line 14a and the transfer gate 58 is connected with the transfer signal line 14b.

In the solid-state imaging device having such a configuration, the line transfer signal φTRF is input to the transfer gate 57 via the transfer signal line 14a. The signal charges are then read out of the photodiodes PD1, PD3 to the floating diffusion FD1, FD2 regions, respectively. Subsequently, when the line transfer signal φTRF is input to the transfer gate 58 via the transfer signal line 14b, the signal charges are read out of the photodiodes PD2, PD4 to the floating diffusion FD1, FD2 regions, respectively.

In the solid-state imaging device according to the fourth embodiment, the transfer gates 57, 58 are each shared by the two photodiodes. Thus, the signals are simultaneously read out of two photodiodes.

However, since one transfer gate is shared by two photodiodes, a distance between the transfer signal lines 14a, 14b is short in the solid-state imaging device having such a configuration. As a result, the aforementioned crosstalk still occurs in the solid-state imaging device having such a configuration.

The solid-state imaging device according to the fourth embodiment includes the circuit configuration used in the driving method examples 1 and 2, and control signals φTERM are input to the transfer signal lines 14a, 14b. Thus, the crosstalk occurred between the adjacent transfer signal lines 14a, 14b can be inhibited.

[Fifth Embodiment]

Figure 14:
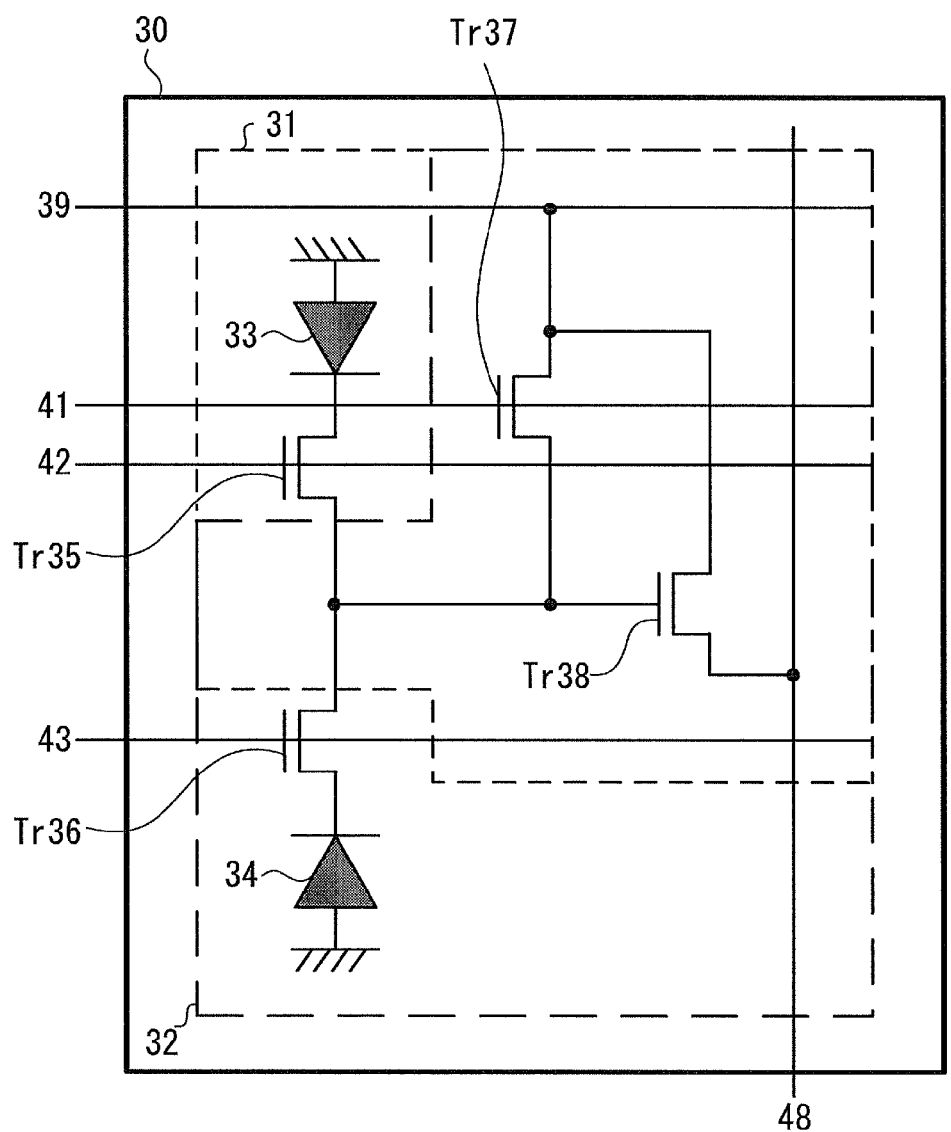
FIG. 14 is an equivalent circuit in major components of the solid-state imaging device according to a fifth embodiment of the invention.

FIG. 14 is a schematic diagram of a solid-state imaging device according to the fifth embodiment of the invention. In the solid-state imaging device according to the fifth embodiment, transistors are shared by upper and lower pixels. A unit cell 30 is indicated by a portion enclosed with a solid line, and the unit cell 30 is formed of two pixels 31, 32. The pixels 31, 32 respectively include photodiode PD33, PD34, and each of the pixels 31, 32 includes a plurality of pixel transistors. The plurality of pixel transistors include two transfer transistors Tr35, Tr36 respectively connected to the photodiodes PD33, PD34, and a reset transistor Tr37 and an amplifier transistor Tr38. Sources of the transfer transistors Tr35, Tr36 are connected to the photodiodes PD33, PD34, drains thereof are connected to sources of the reset transistor Tr37. The floating diffusion FD region (corresponding to the drain region of transfer transistors, source region of reset transistor), which is used as an electric charge-voltage conversion unit between the transfer transistors Tr35, Tr36 and the reset transistor Tr37, is connected to a gate of the amplifier transistor Tr38. Drains of the amplifier transistor Tr38 and the reset transistor Tr37 are connected to a whole area selection signal line 39 supplied with power-supply voltage. A source of the amplifier transistor Tr38 is connected to the vertical signal line 48.

The gates of the transfer transistors Tr35, Tr36 are connected to the transfer signal lines 42, 43 that supply the line transfer signals φTRF to the gates of the transfer transistors Tr35, Tr36, the gate of the reset transistor Tr37 is connected to the reset signal line 41 that supplies the line reset signal φRST to the gate of the reset transistor Tr37.

The solid-state imaging device with this configuration includes the unit cell 30 in which the reset signal line 41 and the transfer signal line 42 of the transfer signal lines 42, 43 is adjacently arranged. Thus, since a distance between the transfer signal lines 42 and reset signal line 41 is short, the aforementioned crosstalk will occur therebetween.

The solid-state imaging device according to the fifth embodiment includes the circuit configuration used in the driving method examples 3 and 4, and a control signal φTERM is input to the transfer signal line 42. Thus, the crosstalk occurred between the transfer signal lines 14 and the reset signal line 14b adjacently arranged can be inhibited.

[Sixth Embodiment]

Figure 15:
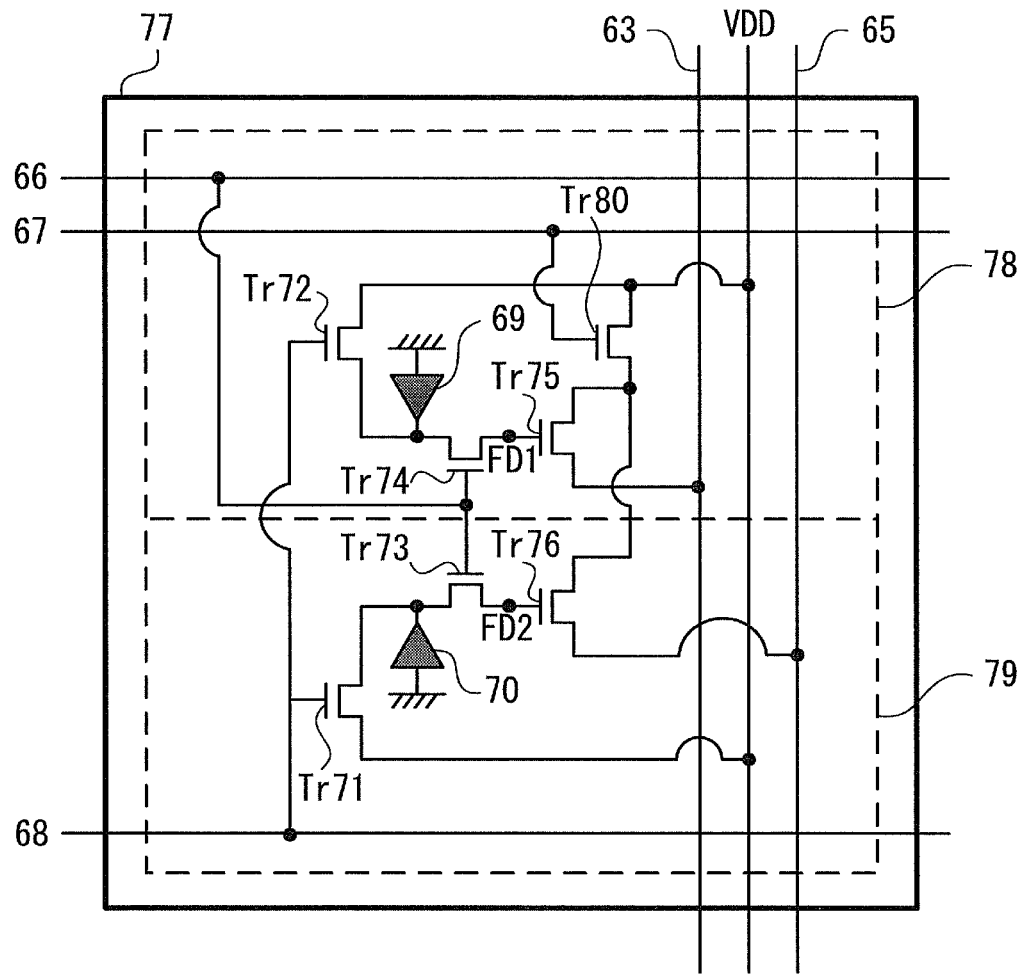
FIG. 15 is an equivalent circuit in major components of the solid-state imaging device according to a sixth embodiment of the invention.

Next, FIG. 15 is a schematic diagram of a solid-state imaging device according to the sixth embodiment of the invention. In the solid-state imaging device according to the sixth embodiment, transistors are shared by two upper and lower pixels. A unit cell 77 is indicated by a portion enclosed with a solid line, and the unit cell 77 includes two pixels 78, 79. The pixels 78, 79 respectively include photodiode PD69, PD70, and each of the pixels 78, 79 includes a plurality of pixel transistors. The plurality of pixel transistors include two transfer transistors Tr74, Tr73 respectively connected to the photodiodes PD69, PD70, and reset transistors Tr72, Tr71 and amplifier transistors Tr75, Tr76.

The photodiodes PD69, PD70 are connected to sources of the transfer transistors Tr74, Tr73, which are connected to drains of the reset transistors Tr72, Tr71. The drains of the transfer transistors Tr74, Tr73 are connected to the floating diffusion FD1, FD2 regions, which are respectively connected to gates of the amplifier transistors Tr75, Tr76. Sources of the transfer transistors Tr75, Tr76 are connected to a drain of the selection transistor Tr80, a source of which is connected to a power supply voltage VDD. Sources of the reset transistor Tr71, Tr72 are also connected to the power supply voltage VDD.

Gates of the transfer transistors Tr74, Tr73 are connected with a transfer signal line 66 that supplies a line transfer signal $\phi$TRF, and gates of the reset transistors Tr72, Tr71 are connected with the reset signal line 68 that supplies the line reset signal $\phi$RST. The gate of the selection transistor Tr80 is connected to the selection signal line 67 to supply the line selection signal $\phi$SEL thereto.

The signal charge accumulated in the photodiode 69 in the pixel 78 is transferred to the signal line 63 whereas the signal charge accumulated in the photodiode 70 in the pixel 79 is transferred to the signal line 65.

The solid-state imaging device with this configuration includes the unit cell 77 in which the selection signal line 67 and the transfer signal line 66 are adjacently arranged to each other. In this configuration, since a distance between the transfer signal line 66 and reset signal line 67 is short, the aforementioned crosstalk will occur therebetween.

The solid-state imaging device according to the fifth embodiment includes the circuit configuration used in the driving method example 5, and a control signal $\phi$TERM is input to the transfer signal line 66 using such a circuit configuration. Thus, the crosstalk occurred between the transfer signal line 66 and the reset signal line 67 adjacently arranged can be inhibited.

The aforementioned solid-state imaging device can be used for electronic devices such as cameras, camera cellphones, and devises including other imaging functionalities.

Electronic Device

An electronic apparatus including the solid-state imaging device according to an embodiment of the invention will be described below.

Figure 16:
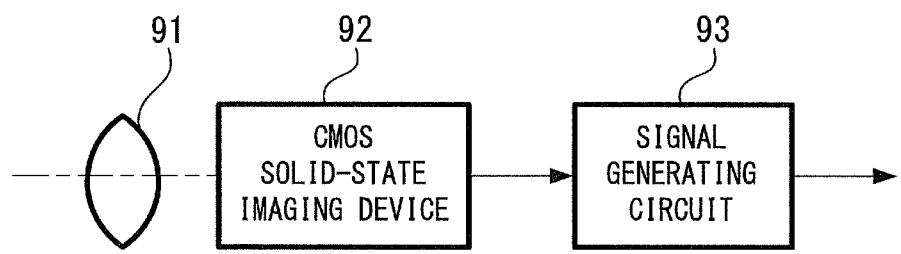
FIG. 16 is a schematic configuration diagram showing an electronic device according to an embodiment of the invention.

FIG. 16 is a schematic diagram of the aforementioned electronic device 90. The electric device 90 according to an embodiment of the invention includes an optical system (optical lens) 91, a solid-state imaging device 92, and a signal processing circuit 93. The solid-state imaging device 92 can employ a configuration according to any of the first to fifth embodiments described above.

In the electronic device 90 according to one embodiment of the invention, image light from a subject is incident through the optical system 91 on an imaging surface of the solid-state imaging device 92. Subsequently, signal charge is accumulated in the solid-state imaging device for a predetermined period. A signal processing circuit 93 then carries out various signal processing on signals output from the solid-state imaging device 92 and outputs the resulting signals.

The solid-state imaging device shown in FIG. 16 can be configured as either a camera module or an imaging module including imaging functionality. The solid-state imaging device according to the embodiment of the invention provided with the aforementioned modules can form an electronic device such as a camera, camera cell-phone, and devise including other imaging functionality.

Since the electronic device according to the embodiment of the invention includes the solid-state imaging device in which fluctuation of pixel outputs are controlled, the electronic device can exhibit high definition images.

The present application contains subject matter related to that disclosed in Japanese Priority Patent Application JP 2008-143630 filed in the Japan Patent Office on May 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a photoelectric conversion portion configured to photoelectrically convert incident light into signal charge and accumulate the signal charge;
a plurality of signal lines including a transfer signal line to which a transfer signal for reading the signal charge accumulated in the photoelectric conversion portion to a floating diffusion region is input;
a driver circuit configured to input a plurality of desired signals into the plurality of signal lines, including the transfer signal line; and
a terminal circuit connected to a side opposite to a side of the transfer signal line where the driver circuit is connected and to which a control signal for securing the transfer signal line at a constant voltage is input before a desired signal of the plurality of desired signals with respect to a signal line adjacent to the transfer signal line of the plurality of signal lines is input to the signal line adjacent to the transfer signal line.

2. A solid-state imaging device according to claim 1, wherein the control signal is one of a signal synchronized with the desired signal input to the signal line adjacent to the transfer signal line, an inverted signal of the desired signal input to the signal line adjacent to the transfer signal line, and a delayed signal of the desired signal input to the signal line adjacent to the transfer signal line.

3. An electric device comprising:
an optical system;
a solid-state imaging device including (a) a photoelectric conversion portion configured to photoelectrically convert light incident through the optical system into signal charge and accumulate the signal charge, (b) signal lines including a transfer signal line to which a transfer signal for reading the signal charge accumulated in the photoelectric conversion portion to a floating diffusion region is input, (c) a driver circuit configured to input desired signals into the signal lines, including the transfer signal line, and (d) a terminal circuit connected to a side opposite to a side of the transfer signal line where the driver circuit is connected, and to which a control signal for securing the transfer signal line at a constant voltage is input before a desired signal of the plurality of desired signals is input to a signal line adjacent to the transfer signal line of the plurality of signal lines; and
a signal processing circuit configured to carry out processing of the signals output from the solid-state imaging device.

* * * * *